United States Patent
Hardt

(10) Patent No.: US 10,686,782 B2
(45) Date of Patent: Jun. 16, 2020

(54) SYSTEM AND METHOD FOR DETERMINING WI-FI CLIENT STATION LOCATION TO AVOID RESALE THEFT

(71) Applicant: ARRIS Enterprises LLC, Suwanee, GA (US)

(72) Inventor: Charles Hardt, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 251 days.

(21) Appl. No.: 15/384,591

(22) Filed: Dec. 20, 2016

(65) Prior Publication Data
US 2018/0176219 A1   Jun. 21, 2018

(51) Int. Cl.
| G06F 7/04 | (2006.01) |
| H04L 29/06 | (2006.01) |
| H04W 12/12 | (2009.01) |
| H04W 12/00 | (2009.01) |

(52) U.S. Cl.
CPC ...... *H04L 63/0876* (2013.01); *H04L 63/1408* (2013.01); *H04W 12/1206* (2019.01); *H04W 12/00503* (2019.01)

(58) Field of Classification Search
CPC . H04L 63/0876; H04L 63/1408; H04W 12/12
USPC .......................................................... 726/6
See application file for complete search history.

(56) References Cited

U.S. PATENT DOCUMENTS

| 8,538,442 B1* | 9/2013 | Ettinger | H04W 40/244 455/446 |
| 8,706,142 B1* | 4/2014 | Mishra | H04W 64/003 455/456.1 |
| 2010/0265093 A1* | 10/2010 | Cho | G01S 5/0252 340/8.1 |
| 2015/0139212 A1* | 5/2015 | Wang | G01S 5/06 370/338 |
| 2015/0365805 A1* | 12/2015 | Bajko | G01S 13/767 455/456.1 |

FOREIGN PATENT DOCUMENTS

WO   WO-2010044599 A2 *  4/2010 .......... H04W 72/046

* cited by examiner

*Primary Examiner* — Mohammad W Reza
(74) *Attorney, Agent, or Firm* — Wenderoth, Lind & Ponack, L.L.P.

(57) ABSTRACT

Methods, systems, and computer readable media operate to facilitate the initiation of an initial fingerprint setup between an access point (AP) and two or more stations (STAs). An initial fingerprint setup process initiates a signal between the AP and each of the STAs and logs at least one signal function associated with each of the STAs for determining an initial location of the STAs relative to the AP. An initial fingerprint is generated from the initial fingerprint setup process. In one aspect the signal function associated with each of the STAs determines an initial location of the STAs relative to the AP based on signal strength. In another aspect, it comprises pulse time of the signal determined by a pulse timing operation. Methods, systems, and computer readable media described herein allow a provider to determine and monitor the relative location of wireless STAs in order to avoid resale theft.

18 Claims, 22 Drawing Sheets

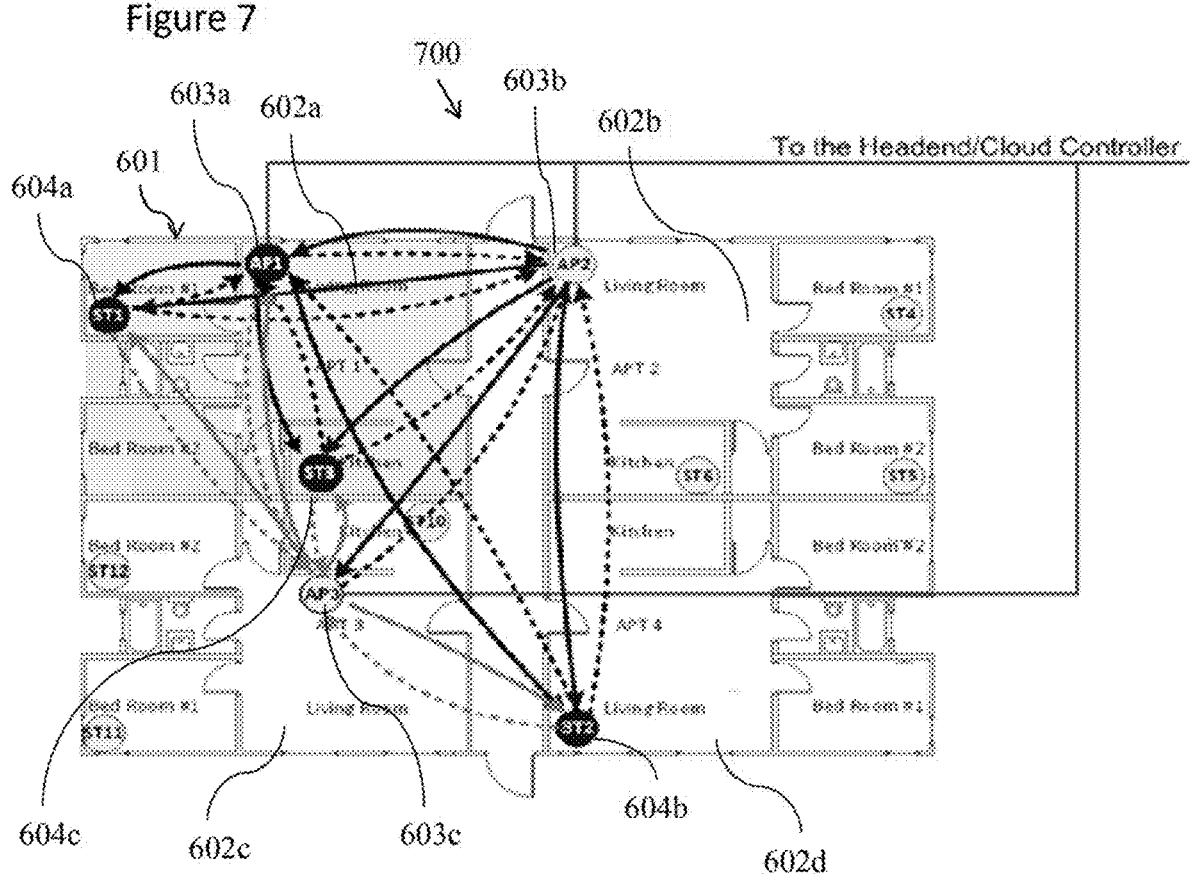

*FIG. 16*

Table 1

Installation Fingerprint

AP1

| Device | Signal |
|--------|--------|
| ST1 | -37db |
| ST2 | (-47db) |
| ST3 | -43db |

*FIG. 17*

Table 2

Post Installation, Changes From Initial Fingerprint

AP1

| Device | Signal |
|--------|--------|
| ST1 | -37db |
| ST2 | (-79db) |
| ST3 | -43db |

FIG. 18

Table 3

Installation Fingerprint

| Device | Signal | AP1 Time | Meters |
|---|---|---|---|
| ST1 | -37db | 1.623E-08 | 4.87 |
| ST2 | -47db | 2.740E-08 | 8.22 |
| ST3 | -43db | 2.233E-08 | 6.7 |

[300,000,000 x Time = Distance]

FIG. 19

Table 4

Post Installation, Changes From Initial Fingerprint

| Device | Signal | AP1 Time | Meters |
|---|---|---|---|
| ST1 | -37db | 1.623E-08 | 4.87 |
| ST2 | -47db | 5.587E-08 | 16.76 |
| ST3 | -43db | 2.233E-08 | 6.7 |

[300,000,000 x Time = Distance]

FIG. 20

Table 5

Installation Fingerprint

| Device | AP1 Signal | AP1 Time | AP1 Meters | AP2 Signal | AP2 Time | AP2 Meters | AP3 Signal | AP3 Time | AP3 Meters |
|---|---|---|---|---|---|---|---|---|---|
| ST1 | -37db | 1.623E-08 | 4.87 | -62db | 4.163E-08 | 12.49 | -57db | 3.553E-08 | 10.66 |
| ST2 | -47db | 2.740E-08 | (8.22) | -68db | 4.673E-08 | (14.02) | -44db | 2.337E-08 | (7.01) |
| ST3 | -43db | 2.233E-08 | 6.7 | -52db | 3.047E-08 | 9.14 | -32db | 1.217E-08 | 3.65 |
| AP1 | N/A | N/A | N/A | -57db | 3.553E-08 | 10.66 | -53db | 3.250E-08 | 9.75 |
| AP2 | -57db | 3.553E-08 | 10.66 | N/A | N/A | N/A | -57db | 3.553E-08 | 10.66 |
| AP3 | -53db | 3.250E-08 | 9.75 | -57db | 3.553E-08 | 10.66 | N/A | N/A | N/A |

[300,000,000 × Time = Distance]

FIG. 21

Table 6

| Post Installation Changes From Initial Fingerprint | | | | | | | | | |
|---|---|---|---|---|---|---|---|---|---|
| | AP1 | | | AP2 | | | AP3 | | |
| Device | Signal | Time | Meters | Signal | Time | Meters | Signal | Time | Meters |
| ST1 | -37db | 1.623E-08 | 4.87 | -62db | 4.163E-08 | 12.49 | -57db | 3.553E-08 | 10.66 |
| ST2 | -79b | 5.587E-08 | 16.76 | -70db | 4.877E-08 | 14.63 | -47db | 2.740E-08 | 8.22 |
| ST3 | -43db | 2.233E-08 | 6.7 | -52db | 3.047E-08 | 9.14 | -32db | 1.217E-08 | 3.65 |
| AP1 | N/A | N/A | N/A | -57db | 3.553E-08 | 10.66 | -53db | 3.250E-08 | 9.75 |
| AP2 | -57db | 3.553E-08 | 10.66 | N/A | N/A | N/A | -57db | 3.553E-08 | 10.66 |
| AP3 | -53db | 3.250E-08 | 9.75 | -57db | 3.553E-08 | 10.66 | N/A | N/A | N/A |

[300,000,000 x Time = Distance]

FIG. 22

Table 7

Installation Fingerprint

| Device | AP1 | | | ST1 | | | ST2 | | | ST3 | | |
|---|---|---|---|---|---|---|---|---|---|---|---|---|
| | Signal | Time | Meters | Signal | Time | Meters | Signal | Time | Meters | Signal | Time | Meters |
| ST1 | -37db | 1.623E-08 | 4.87 | N/A | N/A | N/A | -44db | 2.083E-08 | 6.25 | -52db | 2.713E-08 | 8.14 |
| ST2 | -47db | 2.740E-08 | 8.22 | -44db | 2.083E-08 | 6.25 | N/A | N/A | N/A | -47db | 2.483E-08 | 7.45 |
| ST3 | -43db | 2.233E-08 | 6.7 | -52db | 2.713E-08 | 8.14 | -47db | 2.483E-08 | 7.45 | N/A | N/A | N/A |
| AP1 | N/A | N/A | N/A | -37db | 1.623E-08 | 4.87 | -47db | 2.740E-08 | 8.22 | -43db | 2.233E-08 | 6.7 |

[300,000,000 × Time = Distance]

FIG. 23

| Post Installation Changes From Initial Fingerprint | | | | | | | | | | | | |
|---|---|---|---|---|---|---|---|---|---|---|---|---|
| | AP1 | | | ST1 | | | ST2 | | | ST3 | | |
| Device | Signal | Time | Meters | Signal | Time | Meters | Signal | Time | Meters | Signal | Time | Meters |
| ST1 | -37db | 1.623E-08 | 4.87 | N/A | N/A | N/A | -81db | 5.833E-08 | 17.5 | -52db | 2.713E-08 | 8.14 |
| ST2 | -79db | 5.587E-08 | 16.76 | -81db | 5.833E-08 | 17.5 | N/A | N/A | N/A | -68db | 4.133E-08 | 12.4 |
| ST3 | -43db | 2.233E-08 | 6.7 | -52db | 2.713E-08 | 8.14 | -47db | 2.483E-08 | 7.45 | N/A | N/A | N/A |
| AP1 | N/A | N/A | N/A | -37db | 1.623E-08 | 4.87 | -79db | 5.587E-08 | 16.76 | -43db | 2.233E-08 | 6.7 |

[300,000,000 x Time = Distance]

Table 8

SYSTEM AND METHOD FOR DETERMINING WI-FI CLIENT STATION LOCATION TO AVOID RESALE THEFT

1. FIELD OF THE INVENTION

This disclosure relates to wireless network Wi-Fi enabled set-tops (STAs); and, more particularly, to methods and means for locating these STAs relative to an access point to avoid resale theft.

2. DESCRIPTION OF THE PRIOR ART

Multiple System Operators (MSO(s)) are becoming increasingly concerned with wireless resale theft. With the wide spread introduction of wireless network Wi-Fi enabled set-tops (STAs), MSOs are worried that end users might act as mini resellers of its services (known as the "Resell Hack"). That is, an end user will request the installation of more Wi-Fi STAs (clients) than he/she needs, and in turn rents them out to neighbors. Because multiple dwelling units are located in close proximity to one another, the nearby Wi-Fi equipped STAs access the wired network serviced by the MSO to which the end user's AP access point is directly connected. This represents a loss of income for the MSO. For example, a customer of an MSO residing or doing business in a multiple dwelling unit located in apartment "1" receives three Wi-Fi client set-tops, STAs, in association with his/her AP. The customer then rents one of the STAs to his/her neighbor in apartment "4".

In order to counter resell hack activities MSOs have a desire to receive a notification when a client's STA is moved from one location to another. Of course any process such as this is vulnerable to generation of a large number of false positives, as users occasionally move TVs/set-tops within their respective homes. While integration of a global positioning system (GPS) receiver within an STA has been proposed as a possible solution, it has presented a number of drawbacks. GPS performance within a building is questionable. Additionally, the vast majority of STAs do not currently include GPS receivers. As a result, integration of GPS would require additional hardware, representing a significant increase in cost to the STA. Implementation to existing clients would require collecting and replacing STAs currently in use with the more costly GPS integrated STAs, further fueling the costly upgrade.

Accordingly, there exists a need in the art for improved methods and systems that determine and monitor the location of Wi-Fi client STAs and notify MSOs if relocation is detected without adding additional hardware cost to the STA.

SUMMARY OF THE INVENTION

The present invention provides methods, systems, and computer readable media operable to facilitate the initiation of an initial fingerprint setup between an access point (AP) and two or more stations (STAs). Use of the disclosed methods, systems, and computer readable media described herein allow a provider to determine and monitor the relative location of wireless STAs in order to avoid resale theft. Advantageously, the subject methods, systems, and computer readable media are operable with existing APs and STAs without the need to add any additional hardware cost to the APs or STAs.

In a first aspect of the invention a method for determining and monitoring a relative location of two or more wireless stations (STAs) associated with an access point (AP) is provided. The method comprises the steps of: receiving a predetermined input, wherein the predetermined input signals an initiation of an initial fingerprint setup between the AP and each of the STAs; initiating an initial fingerprint setup process, wherein the initial fingerprint setup process comprises initiating a signal between the AP and each of the STAs and logging at least one signal function associated with each of the STAs for determining an initial location of the STAs relative to the AP; and generating an initial fingerprint from the initial fingerprint setup process.

In another aspect of the invention, there is provided an apparatus for determining and monitoring a relative location of two or more wireless stations (STAs) associated with an access point (AP). The apparatus comprises a first interface configured to be used to receive a predetermined input, wherein the predetermined input signals an initiation of an initial fingerprint setup between the AP and each of the STAs; a module configured to: initiate an initial fingerprint setup process, wherein the initial fingerprint setup process comprises initiating a signal between the AP and each of the STAs and logging at least one signal function associated with each of the STAs for determining an initial location of the STAs relative to the AP; and a second interface configured to be used to: generate an initial fingerprint from the initial fingerprint setup process and to output the initial fingerprint to a Multiple System Operators (MSO) provider.

In another aspect of the invention one or more non-transitory computer readable media having instructions operable to cause one or more processors to perform the operations is provided. The non-transitory computer readable media comprises: receiving a predetermined input, wherein the predetermined input signals an initiation of an initial fingerprint setup between the AP and each of the STAs; initiating an initial fingerprint setup process, wherein the initial fingerprint setup process comprises initiating a signal between the AP and each of the STAs and logging at least one signal function associated with each of the STAs for determining an initial location of the STAs relative to the AP; and generating an initial fingerprint from the initial fingerprint setup process.

In yet another aspect, the signal function associated with each of the STAs for determining an initial location of the STAs relative to the AP comprises signal strength. In a further aspect, it comprises pulse time of the signal determined by a pulse timing operation.

BRIEF DESCRIPTION OF THE DRAWING

The invention will be more fully understood and further advantages will become apparent when reference is had to the following detailed description of the preferred embodiments of the invention and the accompanying drawing, in which:

FIG. 7 is a schematic diagram illustrating relocation of an STA and logging of a post installation change from the initial installation fingerprint generated in FIG. 6;

FIG. 16 shows a table, 1, which illustrates installation fingerprint signal strengths associated with each of ST1, ST2 and ST3;

FIG. 17 shows a table, 2, which illustrates post installation changes from the installation signal strength associated with each of ST1, ST2, and ST3, and shows signal strength for ST2 −79 db, indicating a change from −47 db of −79 db compared to FIG. 16;

FIG. 18 shows a table, 3, which illustrates installation fingerprint signal strength, time, and distance (in meters) associated with each of ST1, ST2 and ST3 with respect to AP1;

FIG. 19 shows a table, 4, which illustrates post installation changes from the installation signal strength, time, and distance (in meters) associated with each of ST1, ST2 and ST3 with respect to AP1;

FIG. 20 shows a table, 5, which illustrates installation fingerprint signal strength, time, and distance (in meters) associated with each of ST1, ST2 and ST3 with respect to AP1, AP2, and AP3;

FIG. 21 shows a table, 6, which illustrates post installation changes from the installation fingerprint signal strength, time, and distance (in meters) associated with each of ST1, ST2 and ST3 with respect to AP1, AP2, and AP3;

FIG. 22 shows a table, 7, which illustrates installation fingerprint signal strength, time, and distance (in meters) associated with each of AP1, ST1, ST2 and ST3 with respect to ST1, ST2, ST3, and AP1;

FIG. 23 shows a table, 8, which illustrates post installation changes from the installation fingerprint signal strength, time, and distance (in meters) associated with each of AP1, ST1, ST2 and ST3 with respect to ST1, ST2, ST3, and AP1.

DETAILED DESCRIPTION OF THE INVENTION

Figure 1:
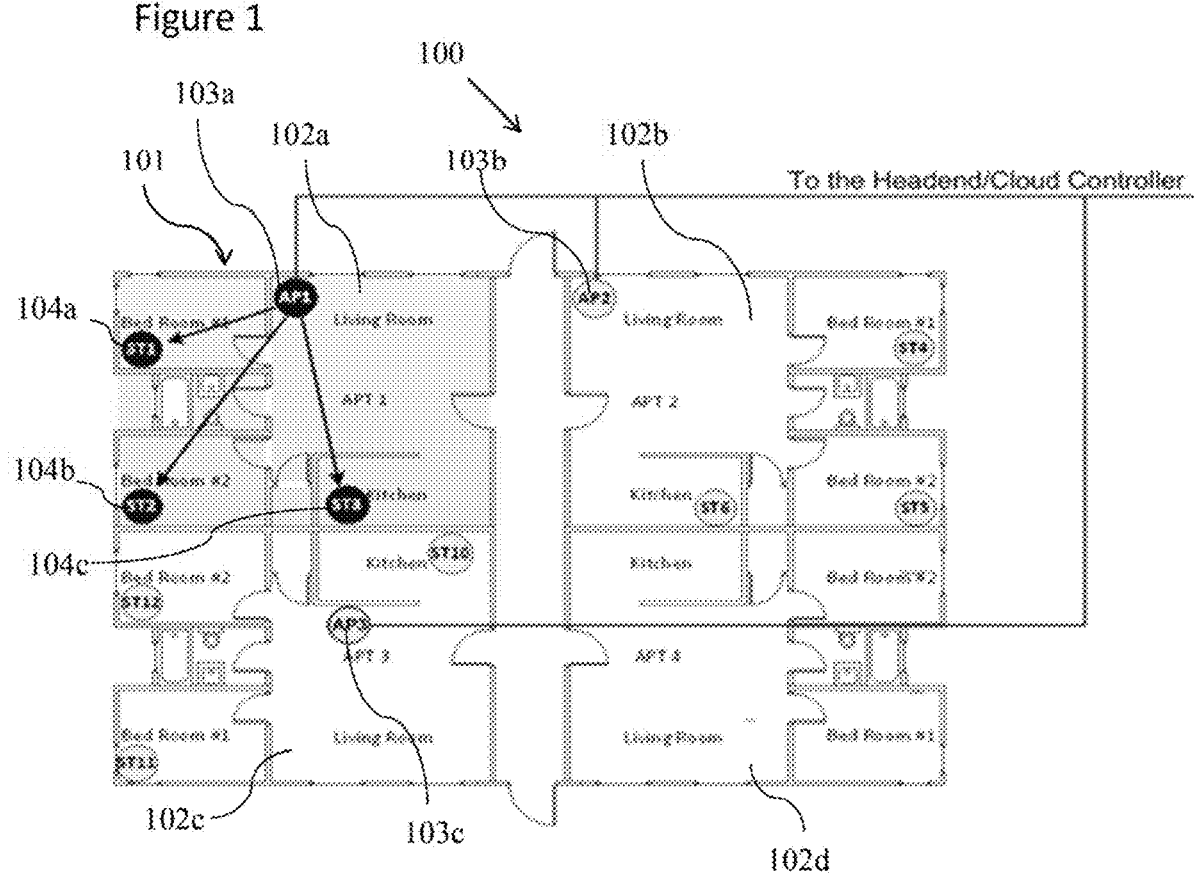
FIG. 1 is a schematic diagram illustrating set-up of an STA and acquiring Access Point(s) (AP) for an MSO's client in a multiple dwelling residential apartment building using a method and system employing single AP and STA signal strength to create an installation fingerprint or home "Birth Certificate"

It is desirable to improve upon methods and systems for initiating and monitoring a wireless connection between a station and an access point to determine the relative location of one or more APs to one or more STAs to mitigate resale theft. Methods and systems are described herein for generating an initial fingerprint or home "birth certificate" for an AP client. Throughout this application the terms initial fingerprint, installation fingerprint and "birth certificate" may be interchangeably used. Post installation fingerprint refers to a later generated fingerprint that is to be used to compare to the initial fingerprint. It is noted that a post installation fingerprint may replace the initial fingerprint for comparison to even later generated "post installation fingerprints". The initial fingerprint or home "birth certificate" sets forth information concerning the location of each STA in relation to the user's AP. Information concerning location is established by methods and systems disclosed herein that are used to locate an STA that is associated with a particular AP without the need to add additional hardware cost to the STA or AP. Methods and systems described herein include logging the signal strength associated with each client, or logging the distance between the AP and each respective STA by converting pulse timing information. As used herein the term "signal function" includes signal strength (to the transmitter power output as received by a reference antenna at a distance from the transmitting antenna), signal pulse timing, etc.

Other aspects of the methods and systems of the present invention include coordination between multiple APs in a multiple dwelling unit to not only determine distance but a more accurate location mapping as well. Once this information is extrapolated, an installation "Birth Certificate" or fingerprint for the home is generated. Should a change occur in the home by relocating an STA or AP, the back office and/or MSO is preferably notified of the change. After which, the MSO can contact the client subscriber to determine if resale theft is occurring. Advantageously, methods and systems described herein allow an MSO to monitor wireless STA and AP locations without having to add additional hardware to the STA. Costly hardware modification of the STA and AP are not required as the systems and methods are integrated with relatively inexpensive software updates.

Multiple dwelling units (MDUs) are discussed broadly herein; however the subject system and methods are applicable to other types of housing and/or business units that are in close enough proximity to allow for sharing of wireless connectivity through APs and STAs. While the subject discussion describes initial set-up and installation of an AP and STAs, it is to be understood that there are existing client accounts. Because the subject system and methods do not require hardware modification of the STAs or APs, pre-existing set-up client STAs and APs do not require recall or redistribution. Existing client APs and STAs are capable of being updated with the appropriate software to execute the system and method to generate an "initial fingerprint" or home "birth certificate" for the existing client account.

Methods, systems, and computer readable media operable to facilitate the initiation of an initial fingerprint setup between an access point (AP) and two or more stations (STAs) are provided. An initial fingerprint setup process comprises initiating a signal between the AP and each of the STAs and logging at least one signal function associated with each of the STAs for determining an initial location of the STAs relative to the AP. An initial fingerprint is generated from the initial fingerprint setup process. In one aspect, the signal function associated with each of the STAs for determining an initial location of the STAs relative to the AP comprises signal strength. In another, it comprises pulse time of the signal determined by a pulse timing operation. Methods, systems, and computer readable media described herein allow a provider to determine and monitor the relative location of wireless STAs in order to avoid resale theft.

The method may further comprise the steps of re-initiating the initial fingerprint setup process at a later time according to the predetermined input signals, generating a post installation fingerprint, and comparing the post installation fingerprint to the initial fingerprint to determine if there has been a change in the signal functions. Alternatively, the method further comprises re-initiating the initial fingerprint setup process upon the occurrence of an event set by the predetermined input signals, generating a post installation fingerprint, and comparing the post installation fingerprint to the initial fingerprint to determine if there has been a change in the signal functions.

Predetermined input signals may include, for nonlimiting example, software that implements the subject method upon system set-up of the AP and STAs (such as with a new customer), a cold start (such as with existing customers), or on a periodic system update or service restart (such as with existing customers). Upon receiving the predetermined input signal the initial fingerprint setup process of the subject method, system and computer readable media is activated. Cold start herein is meant to include situations in which a device, such as an STA, is unplugged and upon re-plugging in and powering up the STA enters restart or reboot mode and the AP is notified of the event. Once notified of the cold start, in one aspect of the invention, the predetermined input signal software of the AP is activated and the subject initial fingerprint setup process of the subject method, system and computer readable media is initiated to determine if there has been a change in the fingerprint.

Figure 2:
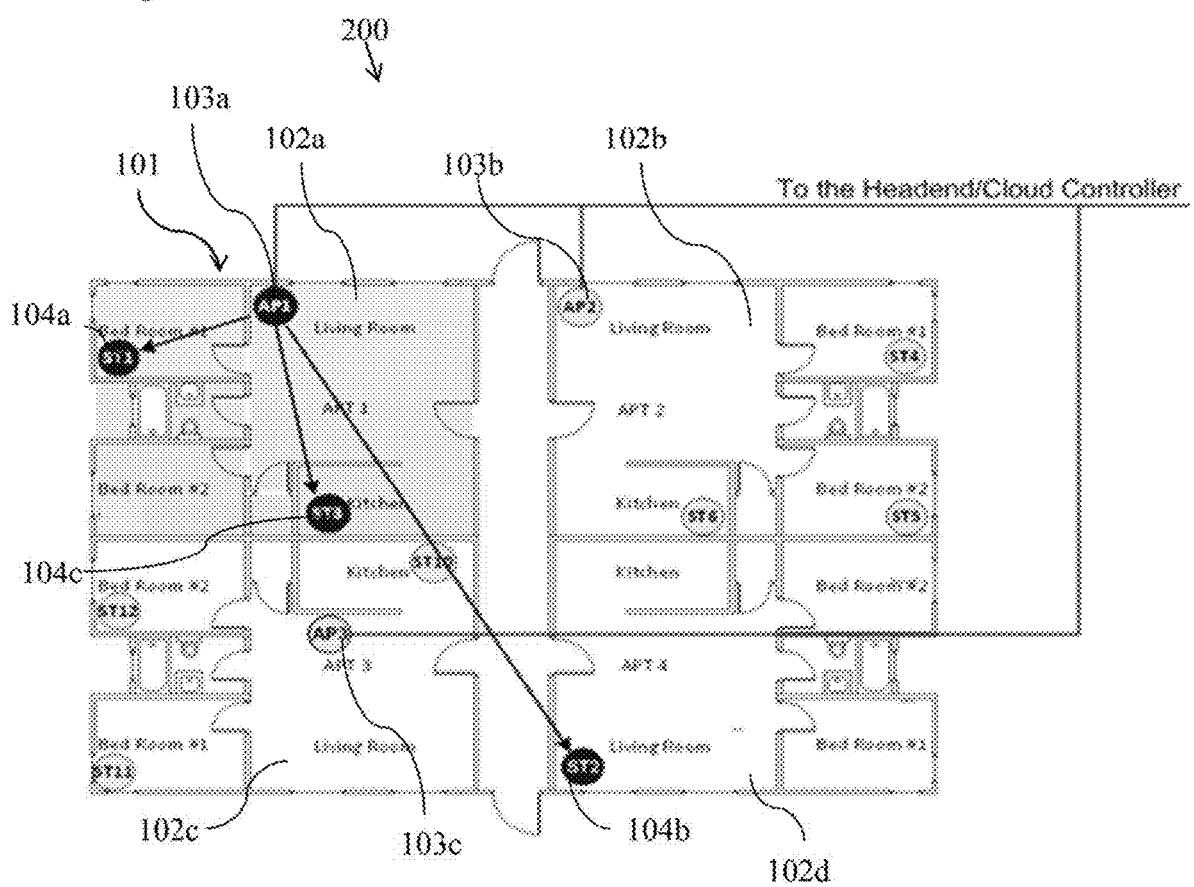
FIG. 2 is a schematic diagram illustrating relocation of an STA and logging of a post installation change from the initial installation fingerprint generated in FIG. 1.

FIGS. 1 and 2 show a first aspect of the invention a method and system single access point (AP), signal strength are utilized to determine a "Birth Certificate" to extrapolate if an STA is relocated. FIG. 1 is a schematic diagram illustrating the initial fingerprint setup process of an STA and acquiring Access Point(s) (AP) for an MSO's client in a multiple dwelling residential apartment building using a method and system employing at least one signal function associated with each of the STAs for determining an initial location of the STAs relative to the AP. In this embodiment or aspect of the invention, the signal function is a measurement of signal strength. A single AP interacting with an STA may be utilized to measure signal strength to create an installation fingerprint or home "Birth Certificate", shown generally at 100. FIG. 2 is a schematic diagram illustrating relocation of an STA and logging of a post installation change from the initial installation fingerprint generated in FIG. 1, shown generally at 200.

A representative residential building floor plan is shown at 101 having multiple living dwellings such as apartments 102a-d, for non-limiting example, with each including an Access Point (AP; herein, AP1-3) 103a-c in communication with the headend/cloud controller associated with an MSO(s). At the time of installation (and/or at the time of reboot or reset or a cold start), AP1 103a of the wireless network initiates communication with each STA (client) located within the residential apartment 102a, herein represented as three STAs, ST1, ST2 and ST3, shown at 104a, 104b, and 104c, respectively. Signal strength associated with each ST1, ST2 and ST3, 104a-c, is determined and logged to create an installation fingerprint/home "Birth Certificate" as shown in Table 1 below.

For representative example, AP1 103a installation fingerprint/home "Birth Certificate" of Table 1 for each of the devices 104a-c correlated to the AP1 103a signal in decibels (db): ST1 104a with an AP1 signal −37 db; ST2 104b with an AP1 signal −47 db; and ST3 104c with an AP1 signal −43 db. Signal strength (field strength) is measured from the AP transmitter power output as received by each STA antenna located at a distance from the AP transmitting antenna.

Preferably both the AP (herein in the representative example, AP1 103a), as well as the system administrator or MSO retain a copy of the installation fingerprint/home "Birth Certificate" of Table 1. At some point, should the AP note that the signal strength to one or more STAs has changed (See FIG. 2), the system administrator or MSO is notified. For example, as shown in FIG. 2, ST2 104b is moved from bedroom #2 106 in apartment 102a to another apartment 102d. When ST2 104b is moved from apartment 102a it is unplugged and upon relocation to apartment 102d it's is plugged in and repowered up initiating reboot. Upon startup ST2 104b enters re-boot or reset mode communicating with the AP1 initiating logarithmic determination of signal strength. Signal strength for ST2 104b is shown as −79 db upon relocation to apartment 102d, indicating a change from −47 db of −79 db, indicating it was relocated further away from the AP1 103a. This disturbance in the initial fingerprint/home "Birth Certificate" of Table 1 above is logged via Table 2 as shown below, and communicated to the MSO.

It would then be up to the MSO to take any corrective action. This method only logs general signal strength (AP to STA) and not direction or distance. It is recognized that wherein the change renders a larger algorithmic decibel, there is an indication that the distance of AP to STA has increased; and wherein the change is a smaller, there is an indication that the distance of AP to STA has decreased. If the AP is relocated, when it is plugged in and restarted the installation fingerprint/home "Birth Certificate" is again generated and logged and the MSO is alerted. At the time of installation, signal strength is determined for each STA and the information is preferably maintained locally as well as delivered to the back office or MSO. Preferably, the AP is updated periodically and the signal strengths for each STA re-logged, and if something changed, the back office of MSO would be notified. It is noted that a user moving an STA around the home might trigger a false positive.

Figure 3:
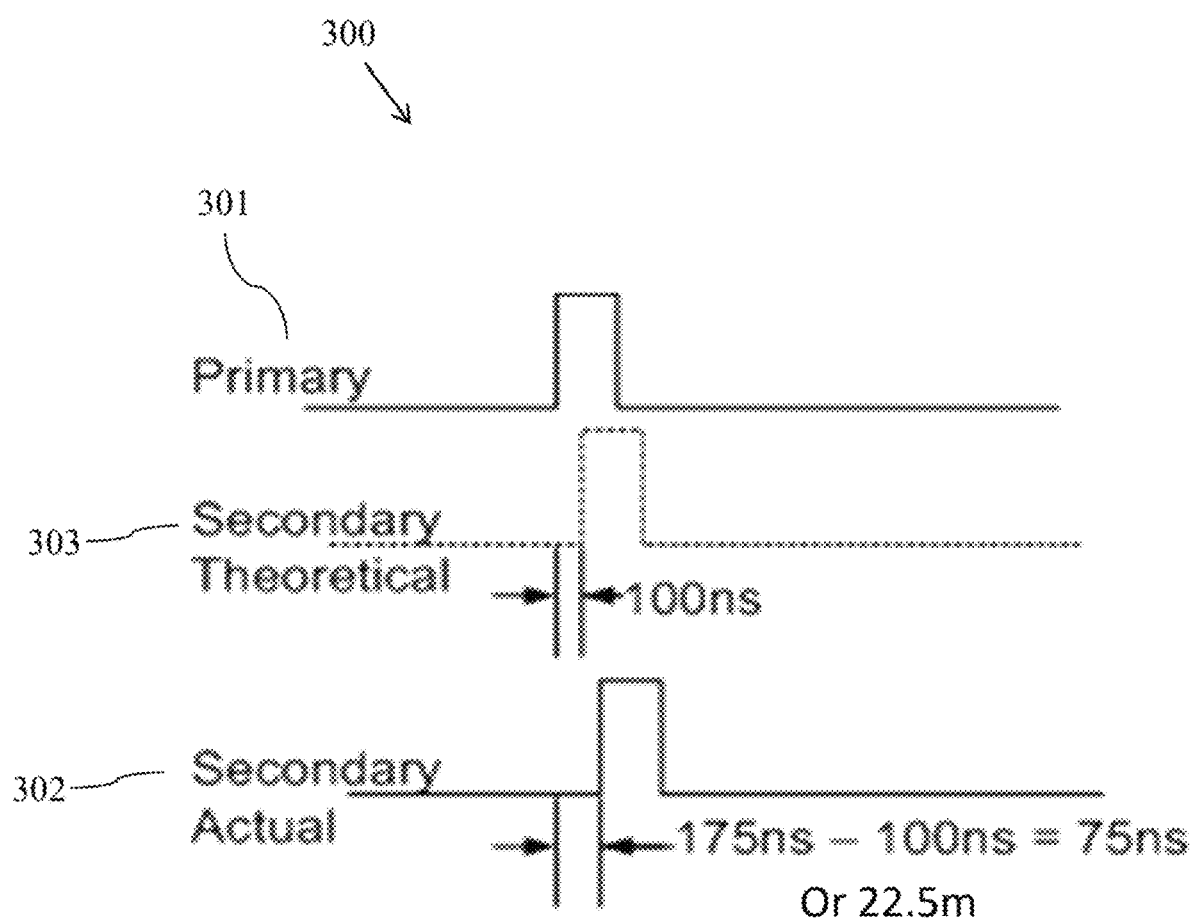
FIG. 3 is a schematic diagram illustrating a pulse timing module for implementation of a method and system that employs a single AP, using timing pulses to determine the distance of STAs from an AP.
Figure 4:
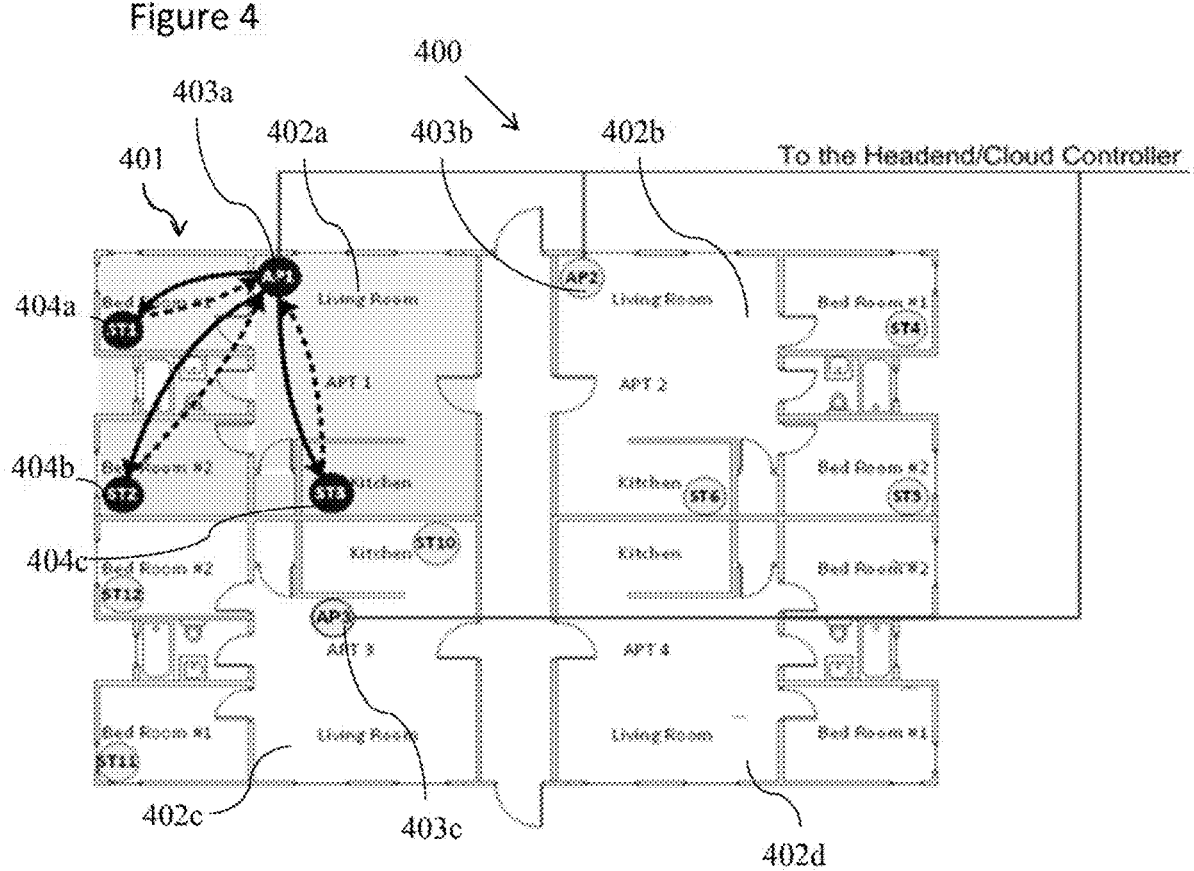
FIG. 4 is a schematic diagram illustrating set-up of an STA and acquiring AP for an MSO's client in a multiple dwelling residential apartment building having a single AP, using timing pulses as illustrated in FIG. 3 to create an installation fingerprint or home "Birth Certificate"
Figure 5:
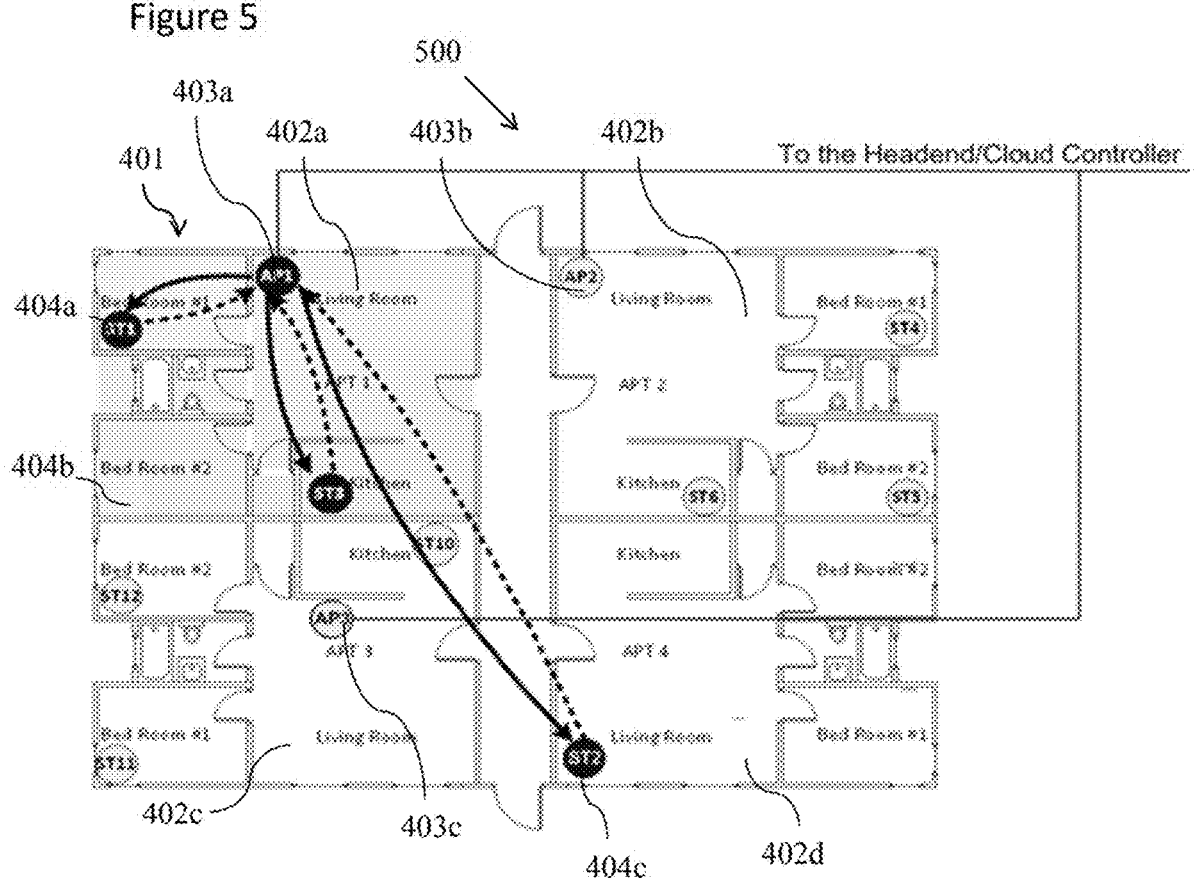
FIG. 5 is a schematic diagram illustrating relocation of an STA and logging of a post installation change from the initial installation fingerprint generated in FIG. 4.

FIGS. 3 through 5 illustrate another aspect of the invention wherein the method and system utilize at least one signal function associated with each of the STAs for determining an initial location of the STAs relative to the AP, wherein the signal function is a timing pulse. In this embodiment a single AP, using timing pulses is used to determine the initial fingerprint or "Birth Certificate" to extrapolate if an STA is relocated. Without the use of GPS, it is still possible to measure distance by calculating the time it takes for a radio signal to travel between the AP and the STA. Radio waves or signals travel at a velocity that is equal to the speed of light traveling in a vacuum, which is 186282 miles per second, or 2.997918E+08 meters per second (rounded 300,000,000 meters per second) (or $3.3 \times 10^{-9}$ seconds per meter). The following formula is preferably used:

$$\text{velocity of radio signal mps} \times [(\text{secondary actual pulse} - \text{secondary theoretical pulse } 100 \text{ ns}) \times (1.0\text{E}-09)] = \text{distance}.$$

$$2.997918\text{E}+08 \text{ mps}^* \times [(175 \text{ ns} - 100 \text{ ns}) \times (1.0\text{E}-09)] = 22.5 \text{ m}$$

*rounded to 3.000E+8

In this aspect of the invention, the distance between the AP and the various STAs is determined by calculating how long it takes for a "Timing Pulse" to travel between the two points (AP=>STA). In order for this operation to work correctly, both the AP and the STAs have to support this feature. It should be noted that this functionality is not part of the 802.11 IEEE Standard, however, the AP can utilize the Request to Send/Clear to Send (RTS/CTS) optional mechanism used by the 802.11 wireless networking protocol Wi-Fi feature so that the functionality co-exists with the IEEE 802.11 standard. IEEE Standard for Information technology—Telecommunications and information exchange between systems Local and metropolitan area networks—Specific requirements Part 11: Wireless LAN Medium Access Control (MAC) and Physical Layer (PHY) Specifications. In order to create the installation certificate/home "Birth Certificate" the AP uses the RTS/CTS feature to block out a time slot so that timing measurements can be made.

FIG. 3 is a schematic diagram illustrating a pulse timing module for implementation a method and system employing single AP, using timing pulses to determine the distance of STAs from an AP, shown generally at 300. The operation initiates with the AP sending out a Primary timing pulse 301. This pulse is received by all STAs associated with the AP. Primary timing pulse 301 both clears and starts an up counter on each STA. A value [herein, 100 ns] is recorded in the up counter as a function of time it took for the secondary signal to travel between the AP and the STA less the initial selected time period. 100 ns after the primary pulse is transmitted, a secondary pulse 302 is transmitted. When the secondary pulse 302 is received by the STA, the up counter is stopped. The value in the up counter is the duration it took for the signal to travel between the AP and the STA (less the initial 100 ns). Theoretically, the secondary pulse should be 100 ns behind the primary pulse as indicated at 303 (Secondary Theoretical). Any value of the secondary actual pulse 302 greater than 100 ns is converted to distance. In the example shown in FIG. 3, the secondary pulse 302 is received after 175 ns, with subtraction of the theoretical secondary pulse 302 of 100 ns, 75 ns or 22.5 m is calculated as follows:

$$\text{velocity of radio signal mps} \times [(\text{secondary actual pulse } 302 - \text{secondary theoretical pulse } 303 \text{ 100 ns}) \times (1.0\text{E}-09)] = \text{distance}$$

$$2.997918\text{E}+08 \text{ mps}^* \times [(175 \text{ ns} - 100 \text{ ns}) \times (1.0\text{E}-09)] = 22.5 \text{ m}$$

*rounded to 3.000E+8

It should be noted that the 100 ns, could be changed to any number of values. Each STA then provides the results of the time measurement back to the AP. This data can be returned back to the AP via standard 802.11 messaging. The AP then converts the timing information to distance as indicated above. With this information, an installation fingerprint/home "Birth Certificate" can be generated setting forth the distance each STA is from the AP, and this information is reported to the MSO.

FIG. 4 is a schematic diagram illustrating set-up of an STA and acquiring AP for an MSO's client in a multiple dwelling residential apartment building using single AP, using timing pulses as illustrated in FIG. 3 to create an installation fingerprint or home "Birth Certificate", shown generally at 400. FIG. 5 is a schematic diagram illustrating relocation of an STA and logging of a post installation change from the initial installation fingerprint generated in FIG. 4, shown generally at 500.

A representative residential building floor plan 401 is constructed having multiple living dwellings such as apartments 402a-d, for non-limiting example, each including an Access Point (AP; herein, AP1-3) 403a-c in communication with the headend/cloud controller associated with an MSO(s). At the time of installation (and/or at the time of reboot or reset), AP1 403a of the wireless network initiates communication with each STA (client) located within the residential apartment 402a, herein represented as three STAs, ST1, ST2 and ST3, shown at 404a, 404b, and 404c, respectively. AP1 403a sends out a primary timing pulse to each of the STAs 404a, 404b and 404c to clear and starting an up counter on each STA 404a, 404b and 404c. A secondary pulse is transmitted 100 ns after the primary pulse. It is noted that while in the representative example 100 ns is utilized as the standard pulse time, other standard pulse times can be selected as the control pulse time. The up counter is stopped when the secondary pulse is received by each respective STA 404a, 404b, and 404c.

Distance associated with each ST1, ST2 and ST3, 404a-c, is extrapolated based on the time it took for the secondary pulse signal to travel between the AP1 403a and each of the STAs 404a, 404b and 404c. An installation fingerprint/home "Birth Certificate", shown in Table 3 below, is generated logging the signal, time and distance (m).

For representative example, AP1 403a installation fingerprint/home "Birth Certificate" of Table 3 for each STA 404a-c is shown correlated to the distance of AP1→STAs 403a, 403b, 403c: ST1 404a at 4.87 m; ST2 404b at 8.22 m; and ST3 404c at 6.7 m.

Preferably both the AP (herein in the representative example, AP1 103a), as well as the system administrator or MSO retain a copy of the installation fingerprint/home "Birth Certificate" of Table 3. At some point, should the AP note that the distance to one or more STAs has changed (See FIG. 5), the system administrator or MSO is notified. For example, as shown in FIG. 5, ST2 404b is moved from bedroom #2 406 in apartment 402a to another apartment 402d. When ST2 404b is moved from apartment 402a it is unplugged and upon relocation to apartment 402d it's is plugged in and repowered up initiating reboot. Upon startup ST2 404b enters re-boot or reset mode communicating with the AP1 initiating the primary and secondary pulses and logarithmic determination of distance based on time. A post installation table in created, as shown below in Table 4.

Distance for ST2 404*b* is shown as 16.76 m upon relocation to apartment 402*d*, indicating a change from 8.22 m of 8.54 m, indicating it was relocated further away from the AP1 403*a*. This disturbance in the initial fingerprint/home "Birth Certificate" of Table 4 is logged and communicated to the MSO. It would then be up to the MSO to take any corrective action. If the AP is relocated, when it is plugged in and restarted the installation fingerprint/home "Birth Certificate" is again generated and logged and the MSO is alerted.

Using this method, the AP can determine the distance to each STAs associated with it. At the time of installation, the AP would locate all STAs, and create the standard home Birth Certificate (see FIG. 4). This information would be maintained locally as well as delivered to the back office or MSO. Preferably, the AP is updated periodically and the distance of each STA re-determined and re-logged, and if something changed, the back office of MSO would be notified (see FIG. 5). As indicated previously, a user moving an STA around the home might trigger a false positive. This method only provides for distance of the STA from the AP (single AP), it does not provide direction. Using only a single AP, each STA's position cannot readily be determined, only the distance is extrapolated. It has been found that in order to determine position; more than one AP is required.

FIGS. 6 through 8D illustrate another aspect of the invention wherein the method and system utilize more than one AP, using at least one signal function comprising timing pulses to determine the initial fingerprint or "Birth Certificate" to extrapolate if an STA is relocated. Using a single AP, as discussed in relation to FIGS. 3 through 5, only the distance between the AP and associated STAs can be determined, while location remains unknown. Thus each STA associated with the AP could exist in an infinite number of positions drawn along a circle around the AP (see FIGS. 8A-8D, discussed hereinafter).

Where there are multiple APs in a given vicinity of an AP/STAs under test, for example in a multiple dwelling unit (MDU), each AP can be used to help definitively establish the location of each of the STAs. This operation preferably utilizes additional setup and control by the back office or MSO to co-ordinate the communication between all of the APs in the given area and to ensure that video or data delivery is not disrupted to the end users.

Figure 6:
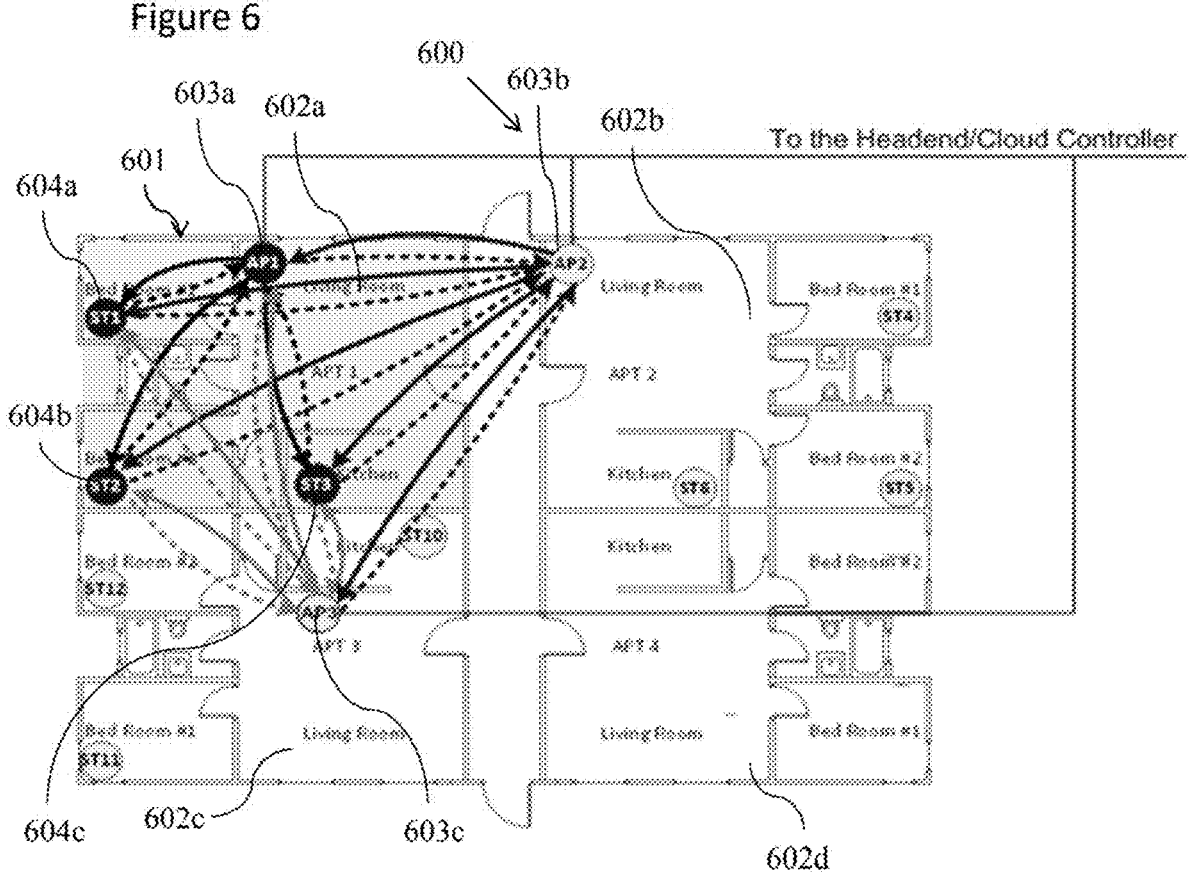
FIG. 6 is a schematic diagram illustrating set-up of an STA and acquiring AP for an MSO's client in a multiple dwelling residential apartment building having Multiple APs, using Timing Pulses as illustrated in FIG. 3 to create an installation fingerprint or home "Birth Certificate"

FIG. 6 is a schematic diagram illustrating set-up of an STA and acquiring AP for an MSO's client in a multiple dwelling residential apartment building using Multiple APs, Using Timing Pulses as illustrated in FIG. 3 to create an installation fingerprint or home "Birth Certificate", shown generally at 600. MDU floor plan 601 includes apartments 602*a-d* with apartments 602*a-c* each including an AP 603*a-c* in communication with the headend/cloud controller associated with an MSO(s). In this aspect of the invention, multiple APs (AP 603*a-c*) are used to send timing pulses to extrapolate an absolute position of STAs (ST1-ST3 shown at 604*a*-604*c*) within a client's apartment 602*a-d*. AP1 603*a* sends timing pulses to ST1 604*a*, ST2 604*b* and ST3 604*c*, as previously discussed in regard to FIGS. 3 through 5. However, in addition, AP1 603*a* sends timing pulses to AP2 603*b* and AP3 603*c*, thus estimating the location of AP2 603*b* and AP3 603*c*. Once this operation is completed, AP2 603*b* repeats the operation by sending timing pulses to ST1 604*a*, ST2 604*b*, ST3 604*c*, AP1 603*a* and AP3 603*c*.

Finally, AP3 603*c* repeats the operation by sending timing pulses to ST1 604*a*, ST2 604*b*, ST3 604*c*, AP1 603*a* and AP2 603*b*. An overall building installation fingerprint or building "Birth Certificate", as shown in Table 5 below, is created and returned to the back office or MSO.

As needed on an occasional basis, the back office or MSO can update or restart the above process and determine if anything has changed. Alternatively, when an STA is unplugged and re-plugged upon reboot the MSO is notified. The MSO can then update or restart the above process to determine if any locations have changed.

FIG. 7 is a schematic diagram illustrating relocation of an STA and logging of a post installation change from the initial installation fingerprint generated in FIG. 6, shown generally at 700. In FIG. 7, ST2 604*b* has moved and the system administrator or MSO is notified. For example, as shown in FIG. 7, ST2 604*b* is moved from bedroom #2 606 in apartment 602*a* to another apartment 602*d*. When ST2 604*b* is moved from apartment 602*a* it is unplugged and upon relocation to apartment 602*d* it's is plugged in and repowered up, initiating reboot. Upon startup ST2 604*b* enters re-boot or reset mode communicating with the AP1 initiating the primary and secondary pulses and logarithmic determination of distance based on time. Preferably, the MSO is immediately notified so that the MSO can coordinate repeat of the timing pulse operation with each neighboring AP, as discussed in FIG. 6. Distance for ST2 604*b* is shown as 16.76 m upon relocation to apartment 602*d* in relation to AP1 603*a*, 14.63 m in relation to AP2 603*b*, and 8.22 m in relation to AP3 603*c*. These changes in distance indicate that ST2 604*b* was relocated further away from the AP1 603*a* and AP2 603*b*, but closer to AP3 603*c*. This disturbance in the initial fingerprint/home "Birth Certificate" is logged, as shown in Table 6 below, and communicated to the MSO. It would then be up to the MSO to take any corrective action.

Figure 8A:
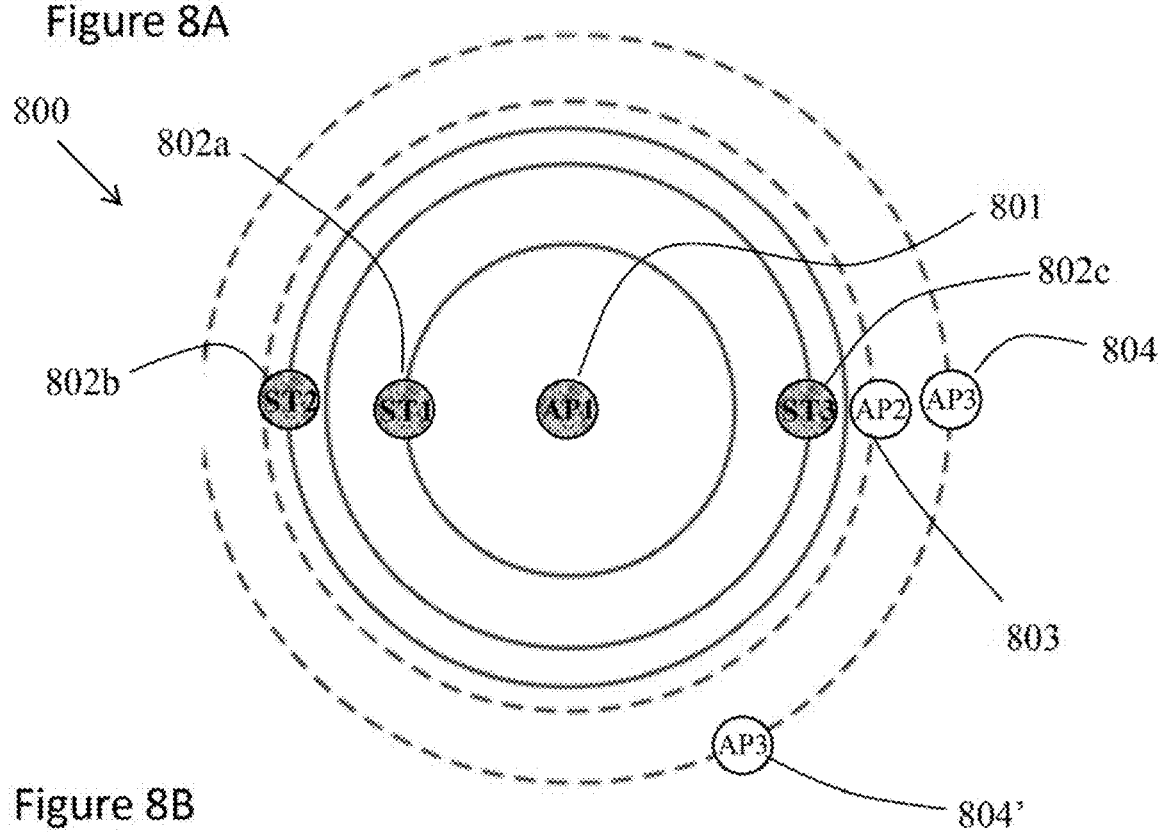
FIG. 8A is a schematic diagram illustrating a single AP in relation to STAs placed at given distances in potentially an infinite number of locations.
Figure 8B:
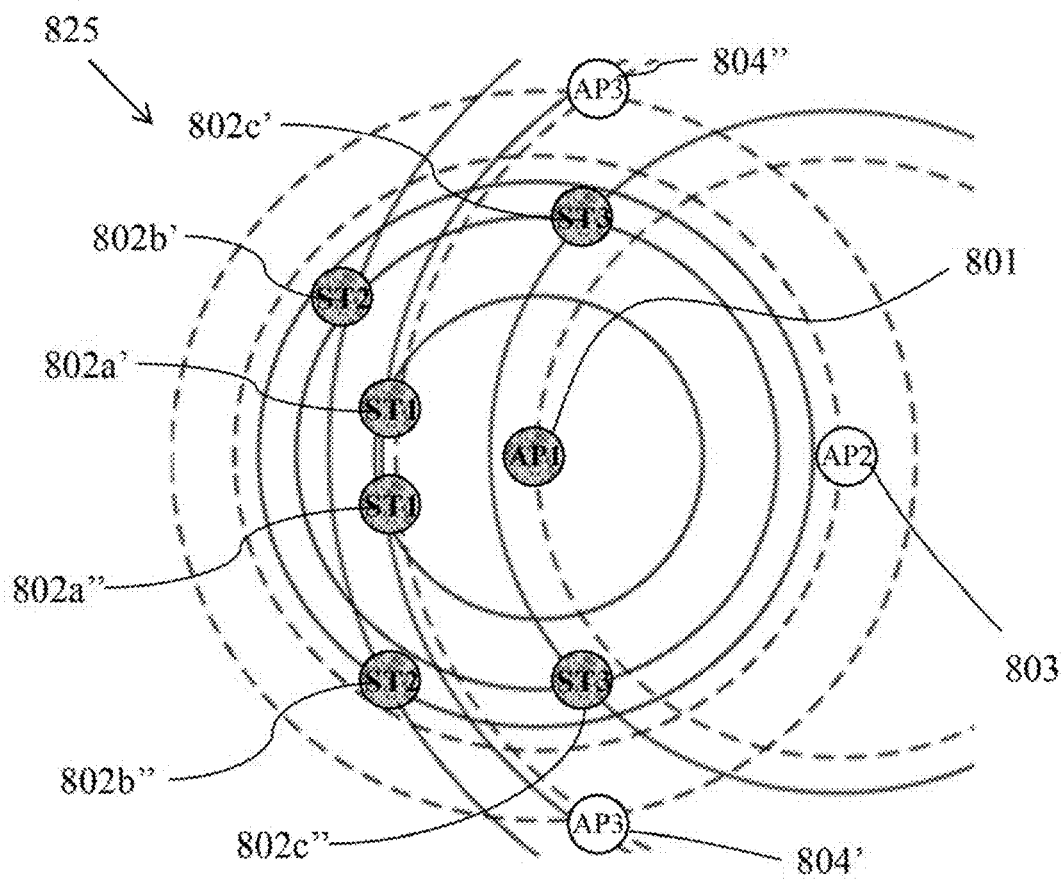
FIG. 8B is a schematic diagram illustrating two APs in relation to STAs placed at given distances resolving the location of the STAs down to two possible positions.
Figure 8C:
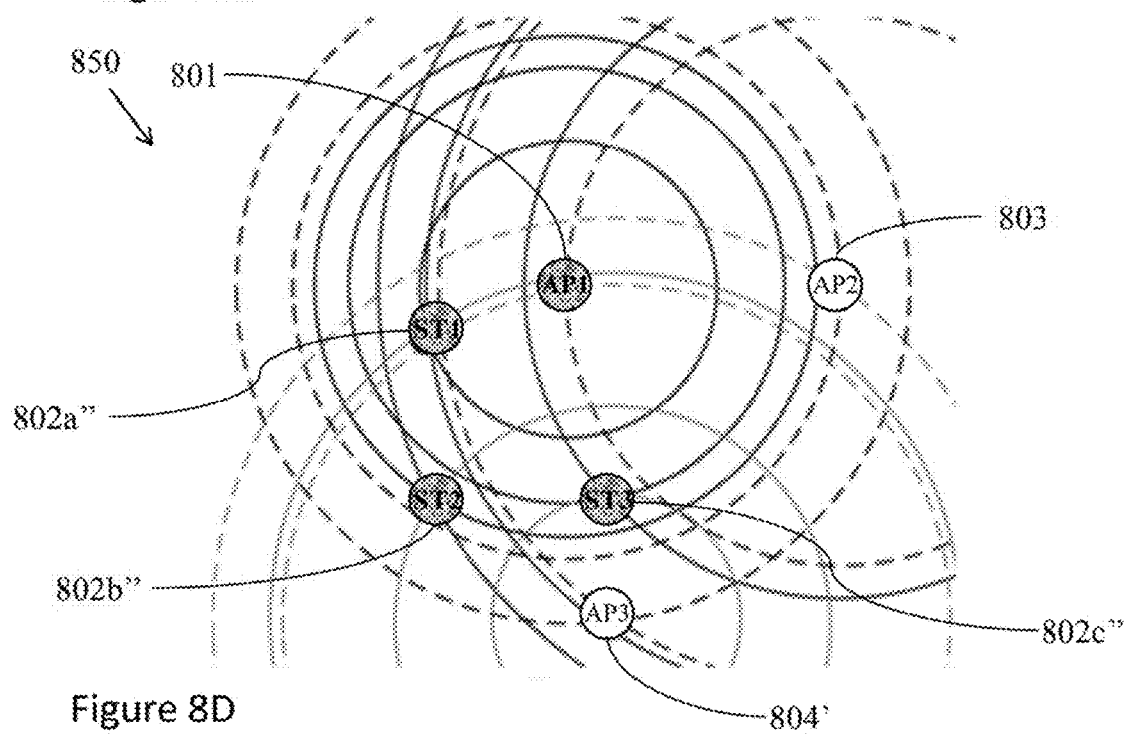
FIG. 8C is a schematic diagram illustrating three or more APs in relation to STAs placed at given distances resolving the absolute location of each of the STAs.
Figure 8D:
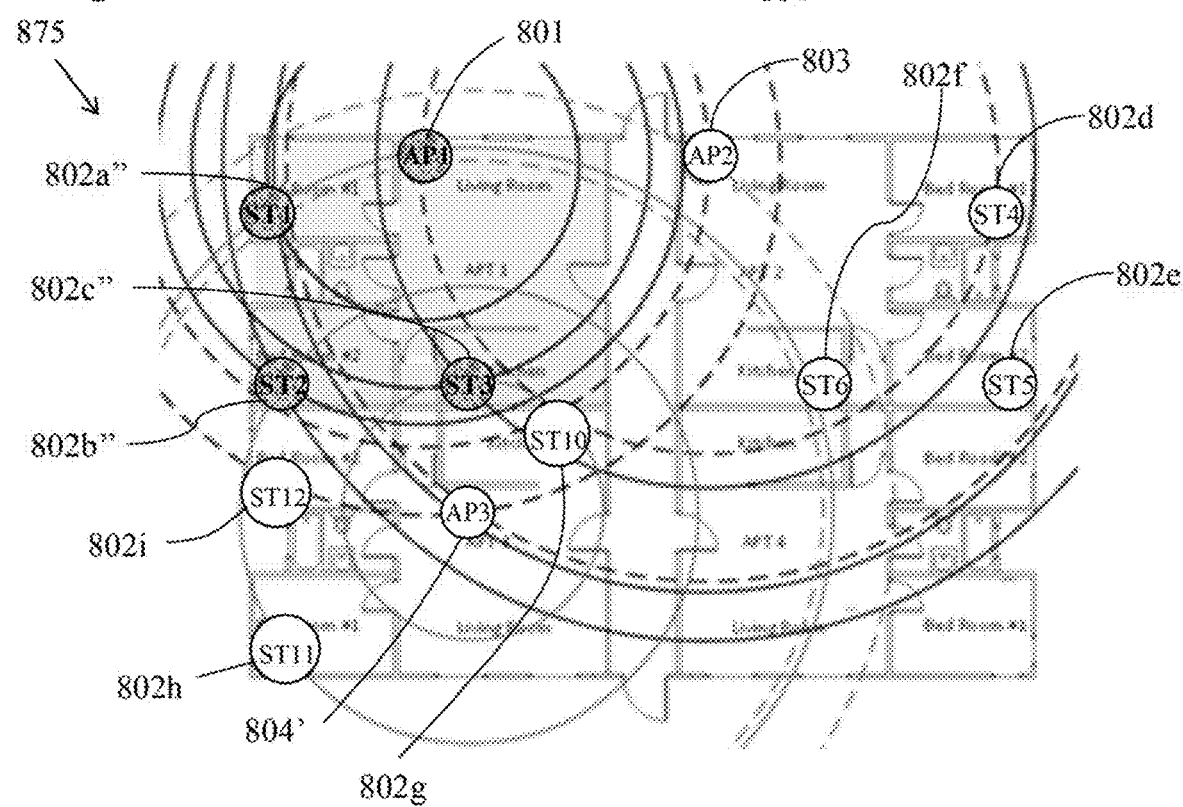
FIG. 8D is a schematic diagram illustrating the extrapolation of FIG. 8C on a multiple dwelling floor plan.

Using the timing information from all three APs, the location of each STA (ST1, ST2, ST3 . . . ) can be resolved. As previously mentioned, location of the STAs can be achieved by using timing information from multiple APs. For example, FIGS. 8A through 8D illustrate extrapolation locations of one or more APs in relation to one or more STAs. FIG. 8A is a schematic diagram illustrating a single AP in relation to STAs placed at given distances in potentially an infinite number of locations, shown generally at 800. FIG. 8B is a schematic diagram illustrating two APs in relation to STAs placed at given distances resolving the location of the STAs down to two possible positions, shown generally at 825. FIG. 8C is a schematic diagram illustrating three or more APs in relation to STAs placed at given distances resolving the absolute location of each of the STAs, shown generally at 850. FIG. 8D is a schematic diagram illustrating the extrapolation of FIG. 8C on a multiple dwelling floor plan, shown at 875.

Referring to FIGS. 8A-8D, a single AP in relation to STAs placed at given distance in potentially an infinite number of locations is shown in FIG. 8A at 800. If only a single AP1 801 is utilized, an STA, herein shown as ST1, ST2, and ST3 can only placed at a given distance or range for wireless communication with the AP1 801, but in potentially an infinite number of locations as indicated. Estimated positions of ST1, ST2, and ST3 are shown at 802*a*, 802*b* and 802*c*. Meanwhile other client APs, herein AP2 and AP3 in a MDU often have a wireless range that overlaps or includes portions of the range of AP1 801. The estimated position of AP2 is shown at 803. Estimated positions of AP3 are shown at 804 and 804'. As illustrated in FIG. 8B, if there are two APs, AP1 801 and AP2 803 that are used to extrapolate the relative positions of ST1, ST2, ST3, and local APs (AP3) to AP1 801 and AP2 803 (known locations) the location of each STA and AP (AP3) can be resolved down to two possible positions: ST1 at positions 802a' and 802a"; ST2 at positions 802b' and 802b"; ST3 at positions 802c' and 802c"; AP3 at positions 804' and 804" (see the overlapping circles). As illustrated in FIG. 8C, if there are three or more APs, AP1 801, AP2 803 and AP3 804 the absolute location of each STA (ST1, ST2, ST3 . . . ) can be determined. Positions of each are indicated as follows: ST1 at absolute position 802a"; ST2 at absolute 802b"; ST3 at absolute position 802c"; AP3 at absolute position 804' (see the overlapping circles). FIG. 8D illustrates the extrapolation of FIG. 8C applied to the MDU floor plan of FIGS. 6 and 7. As shown, extrapolated absolute positions for ST1 at 802a", ST2 at 802b", ST3 at 802c" and AP3 at 804' are shown in relation to AP1 801 and AP2 803. STAs of each client for AP2 803 and AP3 at 804' are also extrapolated by the disclosed method. Extrapolated positions are as indicated in relation to AP2 803 and AP3 804', respectively: ST4 at 802d; ST5 at 802e; and ST6 at 802f; ST10 at 802g; ST11 at 802h; and ST12 at 802i. Accordingly, if a single AP is used, an STA can only be estimated at a given distance, in potentially an infinite number of locations (see FIG. 8A). If there are two APs, the location of the STA can be resolved down to two possible positions (see the overlapping circles in FIG. 8B). If three or more APs are utilized the absolute location of each STA can be determined (See FIG. 8C).

Figure 9:
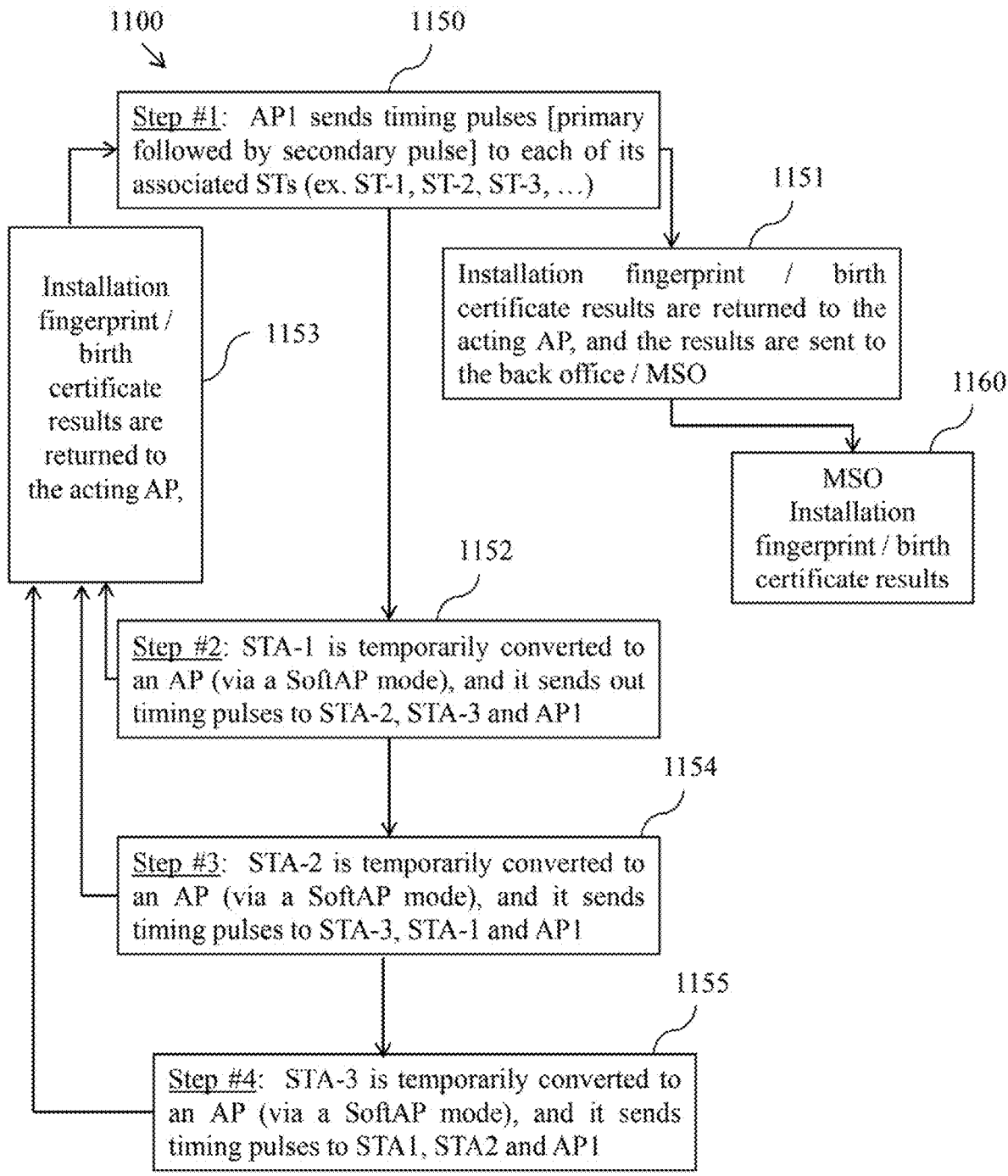
FIG. 9 is a flow chart illustrating an aspect of the invention wherein a method and system using Single AP, with STA each Timing Pulses is used to create an installation fingerprint or home "Birth Certificate"

FIG. 9 is a flow chart illustrating an aspect of the invention wherein a method and system using Single AP, with STA each Timing Pulses is used to create an installation fingerprint or home "Birth Certificate", shown generally at 1100. In this aspect of the invention a Single AP, with STA each Timing Pulses is used to determine the location of the AP from the STAs. Generally, in order to determine the position of the STAs within the home, at least three APs are preferred (for example, see FIGS. 6-8D concerning use of multiple AP). However, in this aspect of the invention the positions are determined using a single AP in combination with the STAs themselves. By enabling the STA's SoftAP mode, each STA is temporarily transformed into an AP [temporary AP STA] for use during the timing operation.

Four steps are generally required as illustrated in the flow chart of FIG. 9 at 1100. In Step #1, shown at 1150, AP1 sends timing pulses (as described generally in FIG. 3) to each of its associated STAs. At the conclusion of Step #1 1150 the results are used to generate an AP1 birth certificate 1151 and the results are sent to the back office, as shown generally at 1160. Step #2 temporarily converts STA-1, or ST1, to an AP [temporary AP STA] by initiating a SoftAP mode, shown at 1152. During Step #2 ST1 sends out timing pulses to STA-2 (ST2), STA-3 (ST3) and AP1. At the conclusion of Step #2 a ST1 birth certificate is generated and returned to the acting AP as indicated at 1153, and the results are sent to AP1 which in turn transmits the results to the back office 1160. In Step #3 shown at 1154 STA-2 (ST2), sends timing pulses to STA-3 (ST3), STA-1 (ST1) and AP1. At the conclusion of Step #3 a ST2 birth certificate is generated and returned to the acting AP as indicated at 1153, and the results are sent to the back office 1160. In Step #4 STA-3 (ST3) sends timing pulses to STA1, STA2 and AP1, as shown at 1155. At the conclusion of Step #4 a ST3 birth certificate is generated and returned to the acting AP as indicated at 1153, and the results are sent to the back office 1160. Thus we can locate all of the STAs in relation to the AP, without using neighboring APs (for example, see FIGS. 6-8D).

Figure 10:
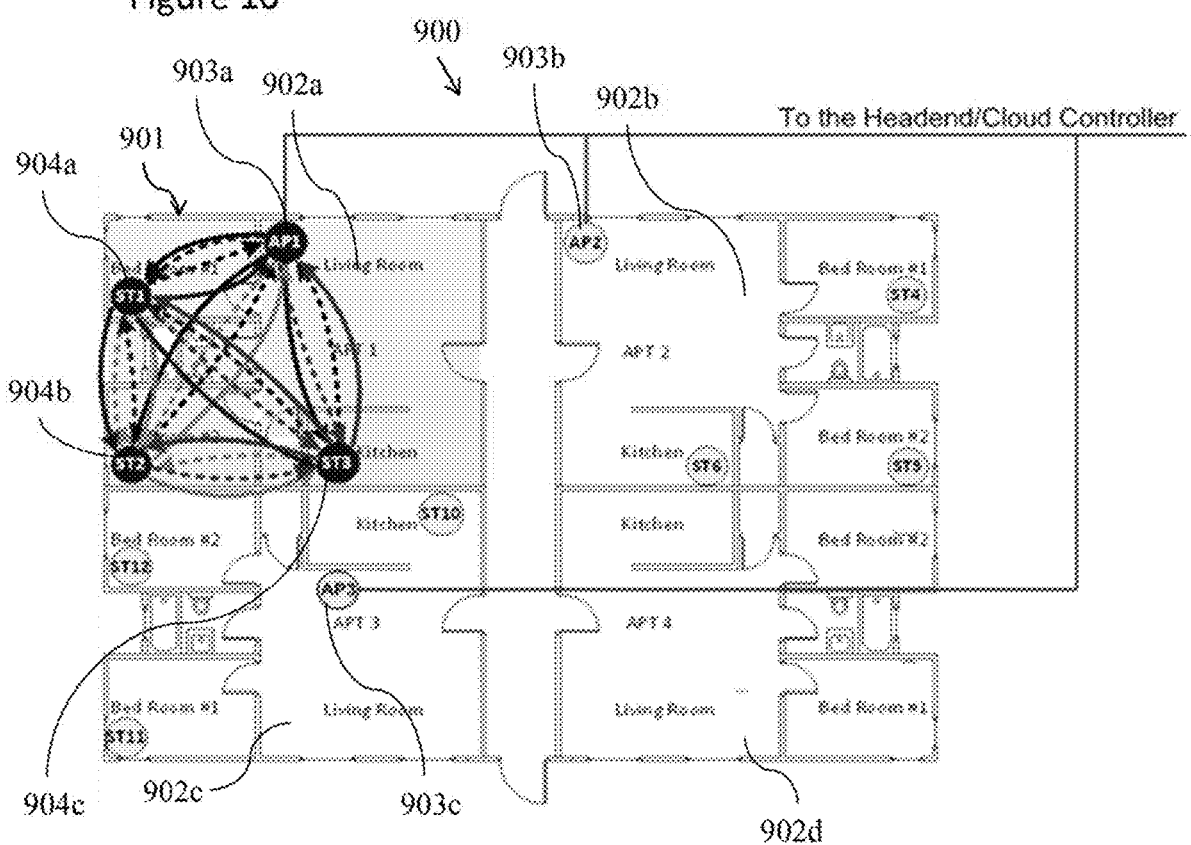
FIG. 10 is a schematic diagram illustrating set-up of an STA and acquiring AP for an MSO's client in a multiple dwelling residential apartment building using Single AP, with STA each Timing Pulses, as illustrated in FIG. 9 for non-limiting example, to create an installation fingerprint or home "Birth Certificate"
Figure 11:
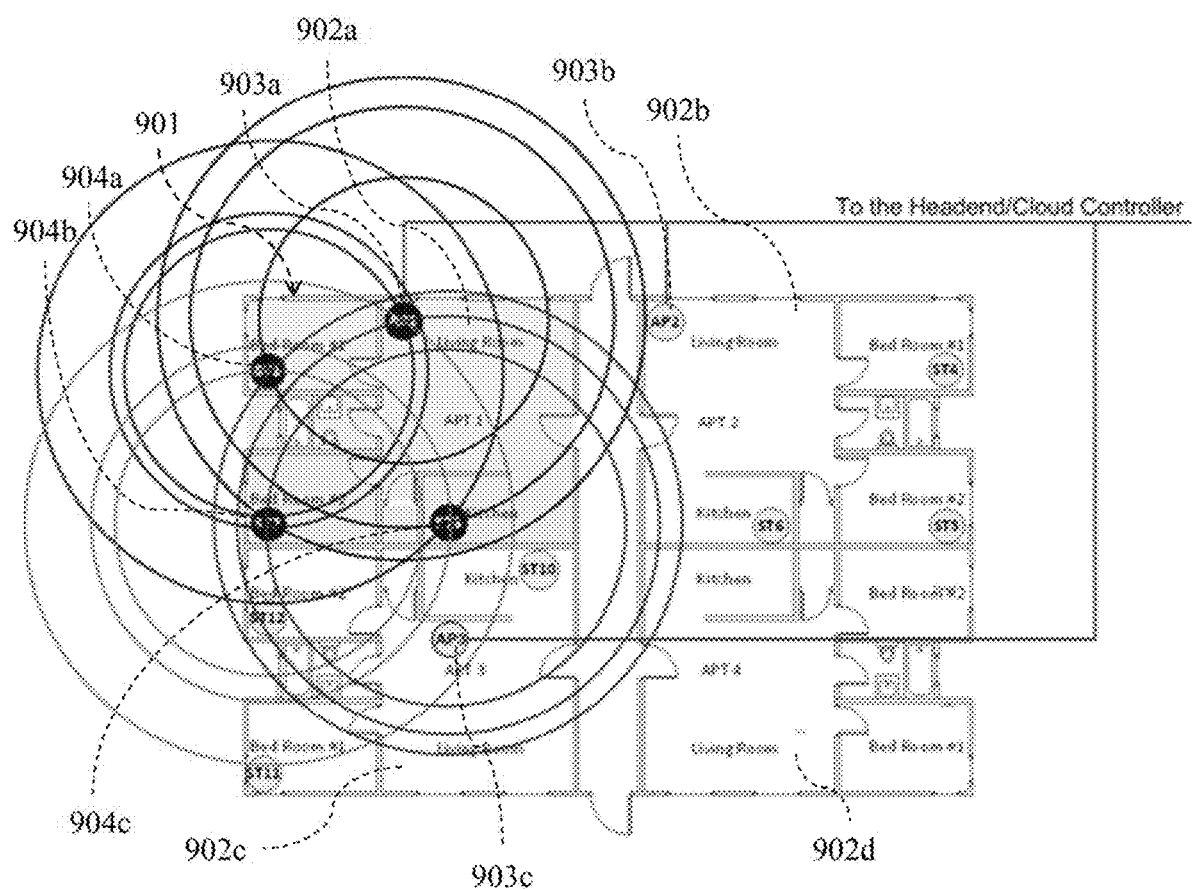
FIG. 11 is a schematic diagram further illustrating set-up of the STA and acquiring AP in creating the installation fingerprint or home "Birth Certificate", as illustrated in FIGS. 9 and 10 for non-limiting example.

FIGS. 10 and 11 illustrate application of the method steps, as illustrated in FIGS. 9 and 10 for non-limiting example, is a schematic diagram illustrating set-up of an STA and acquiring AP for an MSO's client in a multiple dwelling residential apartment building using Single AP, with STA each Timing Pulses as illustrated in FIG. 9 to create an installation fingerprint or home "Birth Certificate", shown generally at 900. FIG. 11 is a schematic diagram further illustrating set-up of the STA and acquiring AP in creating the installation fingerprint or home "Birth Certificate", shown below in Table 7.

Referring to FIGS. 10 and 11, MDU floor plan 901 includes apartments 902a-d with each including an AP 903a-d in communication with the headend/cloud controller associated with an MSO(s). In this aspect of the invention, a single AP (AP1 903a) is used to send timing pulses to extrapolate an absolute position of STAs (ST1-ST3 shown at 904a-904c) within a client's apartment 902a with neighboring apartments 902b-d. AP1 903a sends timing pulses to ST1 904a, ST2 904b and ST3 904c and an AP1 birth certificate (Table 7, top row) is generated and sent to the back office or MSO. STA SoftAP mode for STA1 (ST1) 904a is enabled temporarily transforming ST1 904a into an AP for use during the timing operation. Upon enabling of the SoftAp mode ST1 904a sends out timing pulses to ST2 904b, ST3 904c and AP1 903a. Enabling of the SoftAp mode for ST1 904a is preferably executed through wireless communication with AP1 903a at the conclusion of AP1's 903a timing pulse session. At the conclusion of the timing pulse session performed by ST1 904a a ST1 birth certificate (Table 7, bottom row, far left) is generated and returned to AP1 903a and the results are sent to the back office or MSO. STA SoftAP mode for STA2 (ST2) 904b is enabled temporarily transforming ST2 904b into an AP for use during the timing operation. Upon enabling of the SoftAp mode, ST2 904b sends out timing pulses to ST1 904a, ST3 904c and AP1 903a. Enabling of the SoftAp mode for ST2 904b is preferably executed through wireless communication with AP1 903a at the conclusion of ST1's 904a timing pulse session. At the conclusion of the timing pulse session performed by ST2 904b a ST2 birth certificate (Table 7, bottom row, center column) is generated and returned to AP1 903a and the results are sent to the back office or MSO. STA SoftAP mode for STA3 (ST3) 904c is enabled temporarily transforming ST3 904c into an AP for use during the timing operation. Upon enabling of the SoftAp mode ST3 904c sends out timing pulses to ST1 904a, ST2 904b and AP1 903a. Enabling of the SoftAp mode for ST3 904c is preferably executed through wireless communication with AP1 903a at the conclusion of ST2's 904b timing pulse session. At the conclusion of the timing pulse session performed by ST3 904c a ST3 birth certificate (Table 7, bottom row, far right column) is generated and returned to AP1 903a and the results are sent to the back office or MSO. An overall home installation fingerprint or home "Birth Certificate" (see Table 7) is created including each of the results from the timing pulse sessions and returned to the back office or MSO.

At the conclusion of each of the timing pulse sessions for ST1 904a, ST2 904b and ST3 904c the SoftAp mode is turned off and the timing pulse SoftAp mode remains off unless an activation event that triggers AP1 to initiate SoftAp mode for each of the STAs. An activation event may involve periodic maintenance wherein, as needed on an occasional basis, the back office or MSO updates or restarts the above process to determine if anything has changed. Alternatively, an activation event may be triggered when an STA is unplugged and/or re-plugged in, whereupon at reboot the MSO is notified. The MSO can then update or restart the above process to determine if any locations have changed. Alternatively, during power-up AP1 903*a* may automatically enter reboot timing pulse session mode, re-activating the SoftAp mode for timing pulse sessions for AP1 and ST1-ST3 (see FIG. 12).

Figure 12:
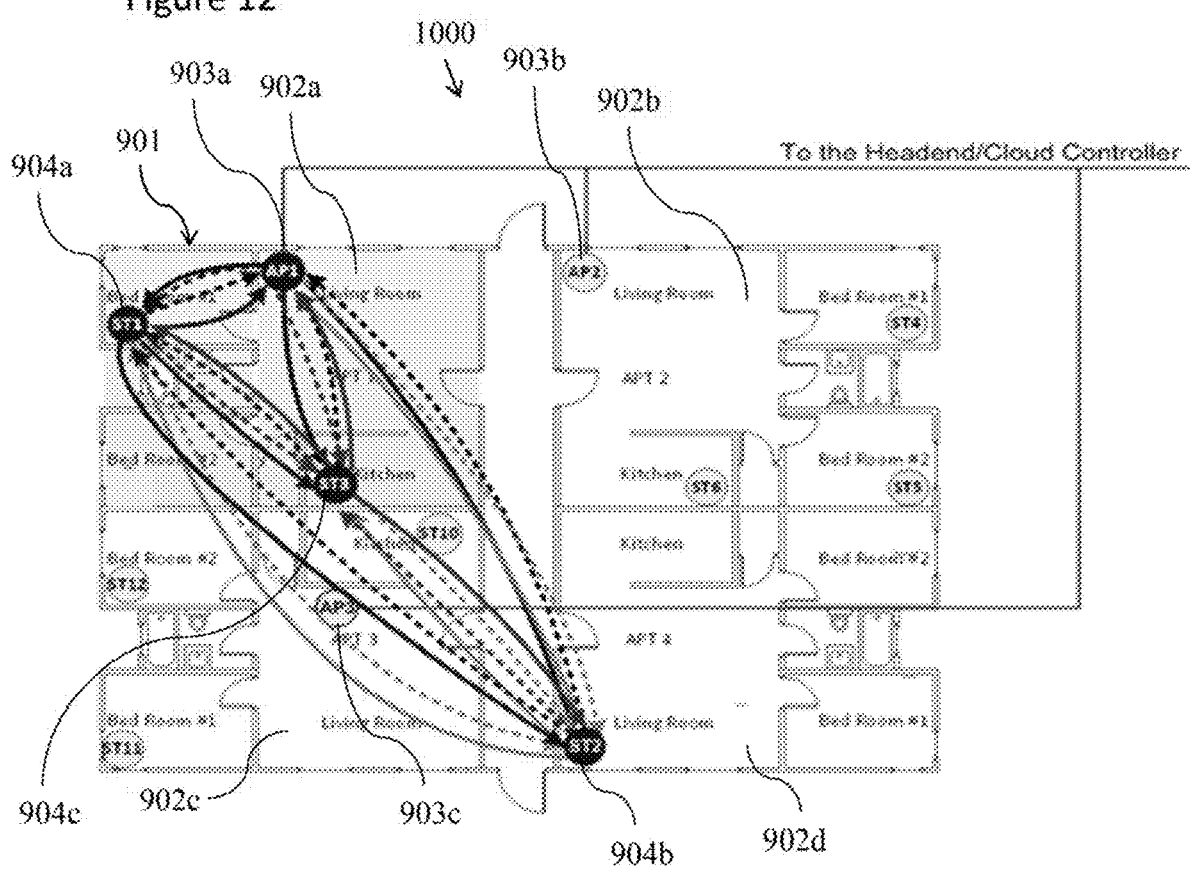
FIG. 12 is a schematic diagram illustrating relocation of an STA and logging of a post installation change from the initial installation fingerprint generated, as illustrated in FIG. 10 for non-limiting example.

FIG. 12 is a schematic diagram illustrating relocation of an STA and logging of a post installation change from the initial installation fingerprint generated, in FIG. 10 for non-limiting example, shown generally at 1000. In FIG. 10, ST2 904*b* has moved and the system administrator or MSO is notified. ST2 904*b* is moved from bedroom #2 906 in apartment 902*a* to another apartment 902*d*. When ST2 904*b* is moved from apartment 902*a* it is unplugged and upon relocation to apartment 902*d* it's is plugged in and repowered up, initiating reboot. Upon startup ST2 904*b* enters re-boot or reset mode communicating with the AP1 initiating the primary and secondary pulses and logarithmic determination of distance based on time and the process set forth in FIGS. 9-11 is repeated. The noted disturbance in the initial fingerprint/home "Birth Certificate", shown in Table 8 below, is logged and a fingerprint/home "Birth Certificate" for each device is generated and communicated to the MSO. It would then be up to the MSO to take any corrective action.

Figure 13:
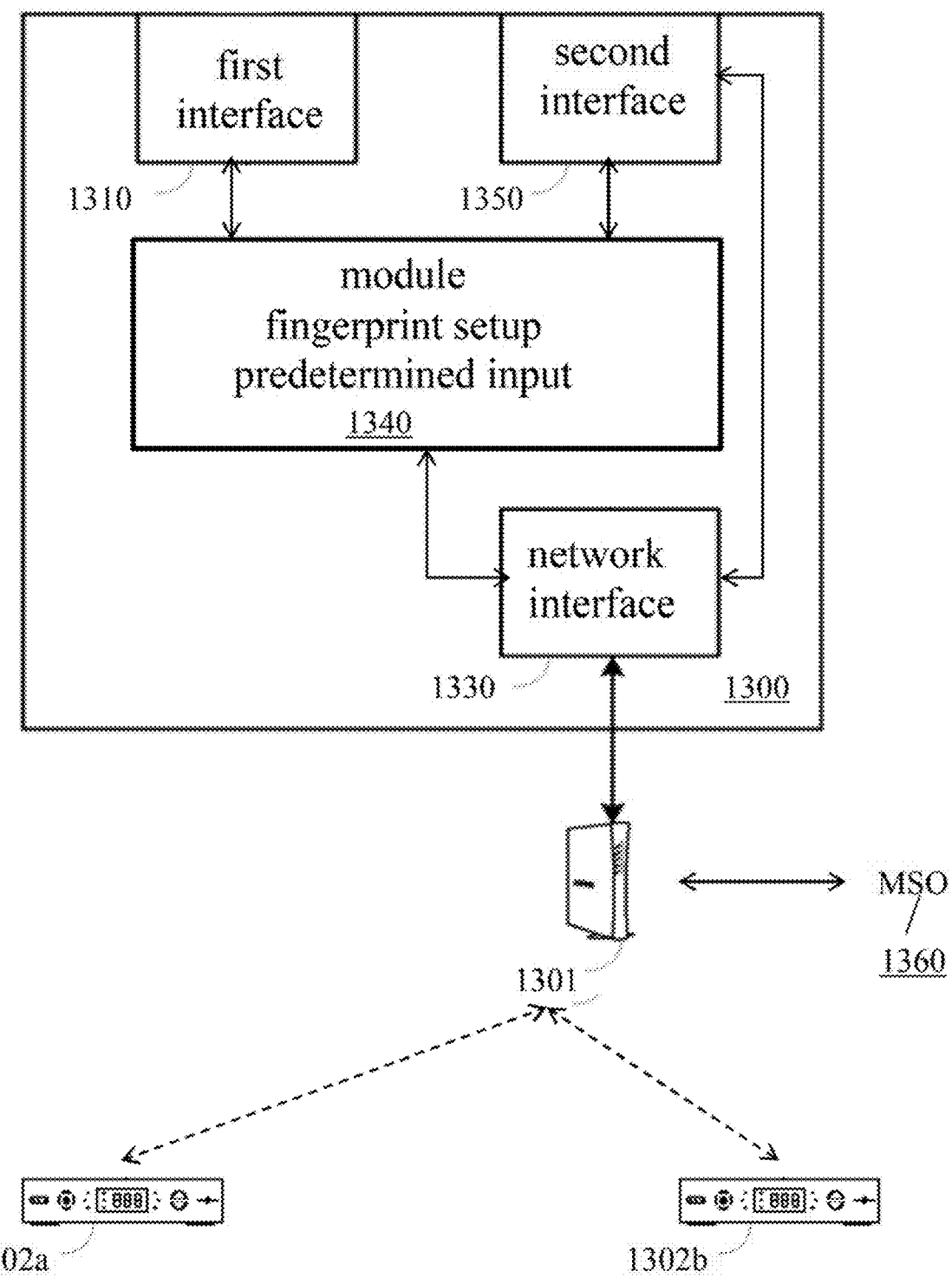
FIG. 13 is a diagram illustrating an apparatus for determining and monitoring the relative location of two or more wireless stations (STAs) associated with an access point (AP)

FIG. 13 is a diagram illustrating an apparatus for determining and monitoring the relative location of two or more wireless stations (STAs) associated with an access point (AP), shown generally at 1300. Component 1300 may be located within a station, which herein is shown as access point (AP) 1301. Component 1300 is operable to facilitate initiation and monitoring of relative locations between AP 1301 and two or more wireless stations (STAs) 1302*a*, 1302*b* and includes a network interface 1330, a first interface 1310, a module 1340, and a second interface 1350. Network interface 1330 interfaces between multiple systems operator (MSO) provider 1360, AP 1301 and STAs 1302*a*, 1302*b*. Module 1340 is configured to initiate an initial fingerprint setup process executed by first interface 1310. First interface 1310 initiates primary and secondary pulses between AP 1301 and STAs 1301*a*, 1302*b*. At least one signal function is logged and logarithmic determination of distance based on time (via process set forth in FIGS. 9-11) is executed to determine initial locations of the STAs 1302*a*, 1302*b* relative to the AP 1301. Module 1340 may include a further predetermined input that causes the fingerprint setup process to repeat at a given later time, by command from the MSO 1360, or upon reboot or restart of any of the STAs 1302*a*, 1302*b*. Second interface 1350 is configured to be used to generate an initial fingerprint from the initial fingerprint setup process and to output the initial fingerprint to the MSO 1360 and to generate later produced fingerprints based on predetermined input of module 1340.

Figure 14:
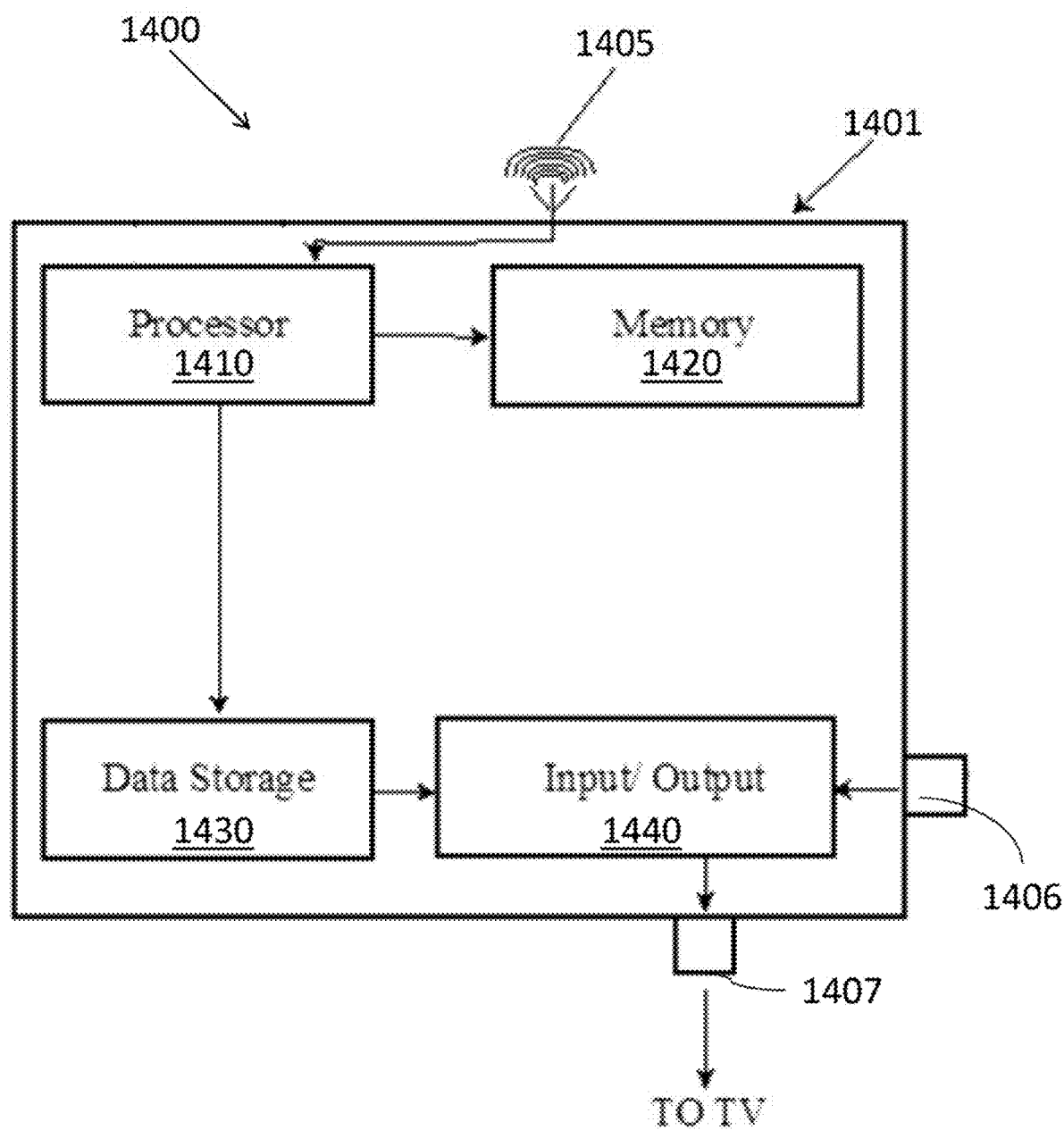
FIG. 14 is an architecture diagram of elements of an STA operable with the subject invention.

FIG. 14 is an architecture diagram of elements of an STA operable with the subject invention, shown generally at 1400. STA 1401 is shown as a source device or apparatus for implementation of the subject invention. The STA 1401 includes hardware generally configured having a module including a processor 1410, a memory 1420, a storage device 1430, and an input/output device 1440. Each of the components 1410, 1420, 1430, and 1440 can, for example, be interconnected using a system bus. The processor 1410 can be capable of processing instructions for execution of the subject method, system and computer readable media within the hardware configuration 1400 (see for example, as discussed in relation to FIG. 15). STA 1401 includes WiFi/Bluetooth Internet connection 1405. STA 1401 is in communication with a provider service 1406. The STA 1401 may connected through an access point (AP) or networking hardware device allowing the STA 1401 and other Wi-Fi compliant devices to connect to a wired network of the service provider 1406. STA 1401 is connected through a high-definition multimedia interface (HDMI) 1407 to a display device, herein a television. A smart phone, tablet or a computer can access the set box using a wireless access point password or an application, and program the features of the set-top box. The display intensity as well as the volume of the TV or smart phone, tablet or a computer may be manually increased or decreased.

Figure 15:
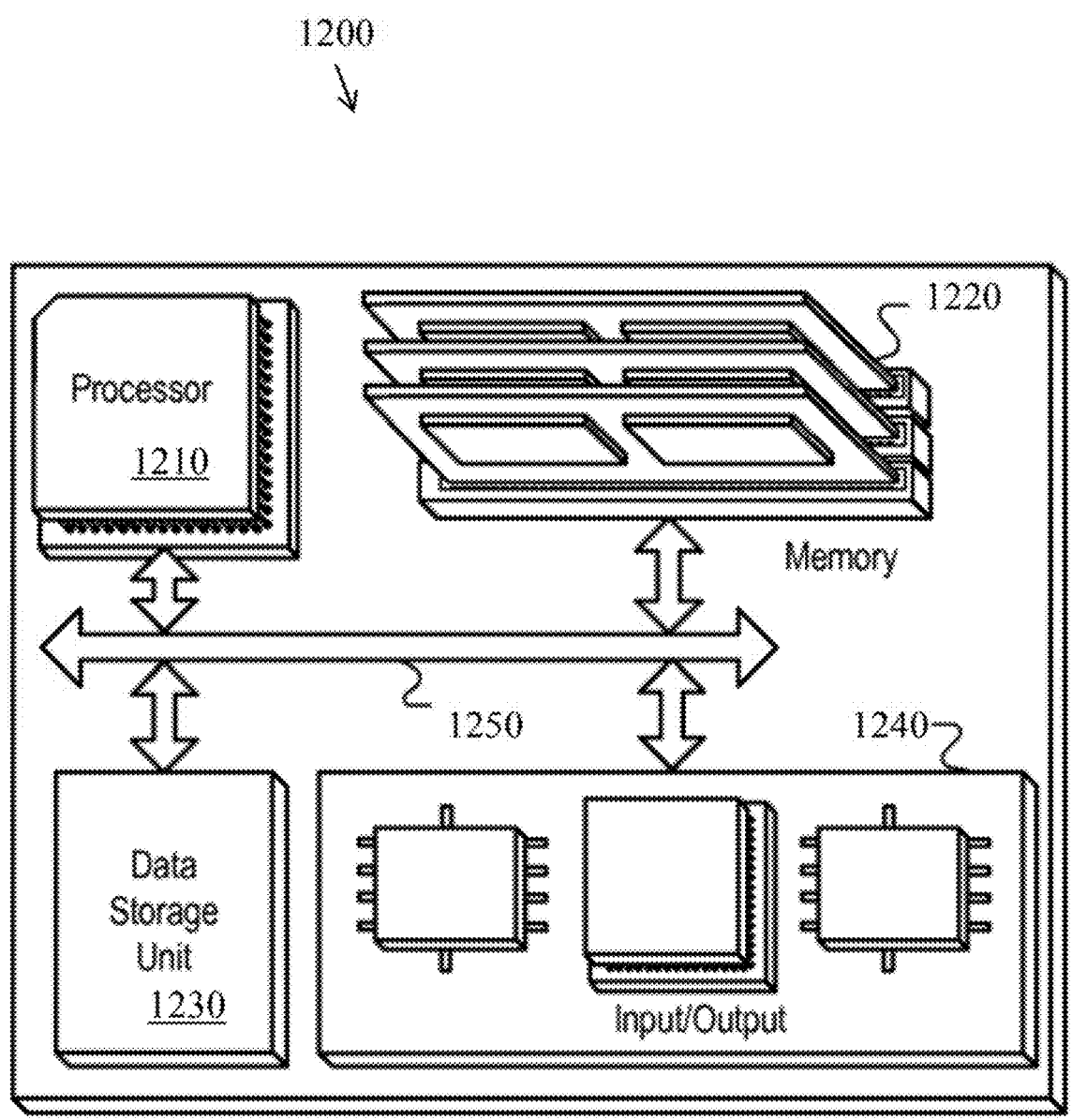
FIG. 15 is a block diagram of a hardware configuration operable to facilitate the initiation and monitoring of the relative location between a station and an access point.

FIG. 15 is a block diagram of a hardware configuration operable to facilitate the initiation and monitoring of the relative location between a station and an access point, shown generally at 1200. The hardware configuration can include a processor 1210, a memory 1220, a storage device 1230, and an input/output device 1240. Each of the components 1210, 1220, 1230, and 1240 can, for example, be interconnected using a system bus 1250. The processor 1210 can be capable of processing instructions for execution of the subject method, system and computer readable media within the hardware configuration 1200. In one implementation, the processor 1210 can be a single-threaded processor. In another implementation, the processor 1210 can be a multi-threaded processor. The processor 1210 can be capable of processing instructions stored in the memory 1220 or on the storage device 1230. The memory 1220 can store information within the hardware configuration 1200. In one implementation, the memory 1220 can be a computer-readable medium. In one implementation, the memory 1220 can be a volatile memory unit. In another implementation, the memory 1220 can be a non-volatile memory unit. In some implementations, the storage device 1230 can be capable of providing mass storage for the hardware configuration 1200. In one implementation, the storage device 1230 can be a computer-readable medium. In various different implementations, the storage device 1230 can, for example, include a hard disk device, an optical disk device, flash memory or some other large capacity storage device. In other implementations, the storage device 1230 can be a device external to the hardware configuration 1200. The input/output device 1240 provides input/output operations for the hardware configuration 1200. In one implementation, the input/output device 1240 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point 103 of FIG. 1, cable modem, router, wireless extender, or other access device) or subscriber device (e.g, station 104 of FIG. 1, STB, etc.). In another implementation, the input/output device can include driver devices configured to send communications to, and receive communications from one or more networks (e.g., WAN, local network, cloud, headend/cloud controller, etc.).

Those skilled in the art will appreciate that the invention improves upon methods and systems for initiating and monitoring a wireless connection between a station and an access point in extrapolating location for preventing or mitigating resale theft or resell hack. Methods and systems are described herein for initiating a wireless setup [or start-up] between one or more stations and one or more access points to determine signal strength and or distance as a function of signal pulse time. The methods and systems described herein allow an MSO or service provider to initiate and monitor wireless distances and/or locations of a station and an access point without having to modify hardware or ad additional hardware for either the station or access point.

The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for determining and monitoring a relative location of two or more wireless stations (STAs) associated with an access point (AP) comprising:
receiving a predetermined input, wherein the predetermined input signals an initiation of an initial fingerprint setup between the AP and each of the STAs;
initiating an initial fingerprint setup process, wherein the initial fingerprint setup process comprises initiating a signal between the AP and each of the STAs and logging at least one signal function associated with the signal between the AP and each of the STAs for determining an initial location of the STAs relative to the AP;
generating an initial fingerprint from the initial fingerprint setup process;
outputting the initial fingerprint to a Multiple System Operators (MSO) provider;
re-initiating the initial fingerprint setup process at a later time according to the predetermined input signals, generating a post installation fingerprint, and comparing the post installation fingerprint to the initial fingerprint to determine if there has been a change in the signal functions; and outputting a communication to the MSO provider if it is determined that there has been a change in the signal functions.

2. The method of claim 1 further comprising re-initiating the initial fingerprint setup process upon the occurrence of an event set by the predetermined input signals, generating a post installation fingerprint, and comparing the post installation fingerprint to the initial fingerprint to determine if there has been a change in the signal functions.

3. The method of claim 2, wherein the event comprises initiation of a restart of the STA after a power disconnect of a period of time.

4. The method of claim 1, wherein the signal function associated with each of the STAs for determining an initial location of the STAs relative to the AP comprises signal strength.

5. The method of claim 1, wherein the signal function associated with each of the STAs for determining an initial location of the STAs relative to the AP comprises pulse time of the signal, wherein the pulse time is determined by a pulse timing operation that measures time it takes for the signal to travel between the AP and the STA.

6. The method of claim 5, wherein a distance of each STA relative to the AP is calculated as a function of the pulse time multiplied by a radio wave speed.

7. The method of claim 5, wherein the AP uses a Request to Send/Clear to Send (RTS/CTS) Wi-Fi feature to block out a time slot for initiating and carrying out the pulse timing operation.

8. The method of claim 5, wherein the pulse timing operation comprises the steps of:
the AP sends out a primary timing pulse to each STA that both clears and starts an up counter on each STA;
after an initial selected time period after the primary timing pulse is transmitted a secondary pulse is transmitted, when the secondary pulse is received by the STA the up counter is stopped;
a value is recorded in the up counter as a function of time it took for the secondary signal to travel between the AP and the STA less the initial selected time period; wherein if the value is greater than the initial selected time period it is converted to distance by multiplying the value by a radio wave speed.

9. The method of claim 8, wherein each STA transmits the value back to the AP by standard 802.11 messaging, and wherein the value is converted to distance by the AP.

10. The method of claim 8, wherein there are at least two APs located within a signal range of one another, at least one AP being a client AP having at least two client STAs associated with it and for which the initial fingerprint is being generated to create a home initial fingerprint, wherein the client AP and client STA's are in overlapping range with the other APs, wherein the client AP and the other APs initiate the pulse timing operation measuring the time it takes for the signal to travel between the client AP, the client STAs, and the other APs, whereby the client AP and the other APs are used to definitively locate each of the client STAs to generate the home initial fingerprint.

11. The method of claim 10, wherein there are at least three APs, whereby an absolute location of each client STA is determined.

12. The method of claim 8 further comprising the steps of:
each STA is sequentially temporarily converted to an AP mode rendering a temporary AP STA, whereupon the timing pulse operation is initiated by the AP STA;
during the timing pulse operation the AP STA sends out an AP STA primary timing pulse to the AP and each of the STAs that both clears and starts an up counter on the AP and each STA;
after an initial selected time period after the primary timing pulse is transmitted a secondary pulse is transmitted, when the secondary pulse is received by the AP and each STA the up counter is stopped;
an AP STA value is recorded in the up counter as a function of time it took for the secondary signal to travel between the AP STA and the AP and the STAs less the initial selected time period; wherein if the AP STA value is greater than the initial selected time period it is converted to distance by multiplying the AP STA value by a radio wave speed;
an AP STA initial fingerprint is generated from steps above and transmitted to the AP and the AP mode for the STA deactivated;
the steps are repeated until performed by each STA.

13. The method of claim 1, wherein the AP and the STAs do not require any additional hardware to execute the method.

14. An apparatus for determining and monitoring a relative location of two or more wireless stations (STAs) associated with an access point (AP) comprising:
a first interface configured to be used to receive a predetermined input, wherein the predetermined input signals an initiation of an initial fingerprint setup between the AP and each of the STAs;
a module configured to: initiate an initial fingerprint setup process, wherein the initial fingerprint setup process comprises initiating a signal between the AP and each of the STAs and logging at least one signal function associated with the signal between the AP and each of the STAs for determining an initial location of the STAs relative to the AP; and
a second interface configured to be used to: generate an initial fingerprint from the initial fingerprint setup process and to output the initial fingerprint to a Multiple System Operators (MSO) provider; re-initiate the initial fingerprint setup process at a later time according to the predetermined input signals, generate a post installation fingerprint, comparing the post installation fingerprint to the initial fingerprint to determine if there has been a change in the signal functions; and output a communication to the MSO provider if it is determined that there has been a change in the signal functions.

15. The apparatus of claim 14, wherein the signal function associated with each of the STAs for determining an initial location of the STAs relative to the AP comprises signal strength.

16. The apparatus of claim 14, wherein the signal function associated with each of the STAs for determining an initial location of the STAs relative to the AP comprises pulse time of the signal, wherein the pulse time is determined by a pulse timing operation that measures a time it takes for the signal to travel between the AP and the STA, and wherein a distance of each STA relative to the AP is calculated as a function of the pulse time multiplied by a radio wave speed.

17. One or more non-transitory computer readable media having instructions operable to cause one or more processors to perform the operations comprising:

receiving a predetermined input, wherein the predetermined input signals an initiation of an initial fingerprint setup between the AP and each of the STAs;

initiating an initial fingerprint setup process, wherein the initial fingerprint setup process comprises initiating a signal between the AP and each of the STAs and logging at least one signal function associated with the signal between the AP and each of the STAs for determining an initial location of the STAs relative to the AP;

generating an initial fingerprint from the initial fingerprint setup process;

outputting the initial fingerprint to a Multiple System Operators (MSO) provider;

re-initiating the initial fingerprint setup process at a later time according to the predetermined input signals, generating a post installation fingerprint, and comparing the post installation fingerprint to the initial fingerprint to determine if there has been a change in the signal functions; and outputting a communication to the MSO provider if it is determined that there has been a change in the signal functions.

18. The method of claim 1 further comprising re-initiating the initial fingerprint setup process upon the occurrence of an event set by the predetermined input signals, generating a post installation fingerprint, and comparing the post installation fingerprint to the initial fingerprint to determine if there has been a change in the signal functions.

* * * * *